United States Patent [19]
Saito

[11] Patent Number: 5,664,081
[45] Date of Patent: Sep. 2, 1997

[54] METHOD FOR FORMING A SYMMETRICAL IMAGE

[75] Inventor: Shigeru Saito, Tokyo, Japan

[73] Assignee: NEC Corporation, Tokyo, Japan

[21] Appl. No.: 550,239

[22] Filed: Oct. 30, 1995

[30] Foreign Application Priority Data

Oct. 31, 1994 [JP] Japan ................................. 6-290682
Nov. 18, 1994 [JP] Japan ................................. 6-285187

[51] Int. Cl.⁶ .................................................. G06T 3/00
[52] U.S. Cl. .......................... 345/433; 345/441; 345/469; 345/443
[58] Field of Search ...................... 395/133, 141, 395/142, 143, 169, 168, 138; 382/203, 199, 293

[56] References Cited

U.S. PATENT DOCUMENTS 4,797,842  1/1989  Nackman et al. ................. 364/578

OTHER PUBLICATIONS

Foley et al.; "Computer Graphics", Addison–Wesley Publishing Co., Reading, PA, 1992, pp. 471–532.

"Explanation of Hanako Ver. 2", 4th print, 2nd Edition, May 14, 1990, K. K. Justsystem, p. 177.

*Primary Examiner*—Phu K. Nguyen
*Assistant Examiner*—Sabrina Dickens
*Attorney, Agent, or Firm*—Whitham, Curtis, Whitham & McGinn

[57] ABSTRACT

A symmetrical image is generated from an entire object image having an approximately symmetrical shape. The object image has a plurality of control points. The object image may be a polygon having vertices as the control points. In a first step, an operator inputs image data indicative of the positions of the control points. In a second step, an axis of symmetry of the object image is determined automatically or manually. In a third step, a first control point is paired with a second control point having a symmetrical relationship with the first control point. In a fourth step, the image data is modified so that the first and second control points have symmetrical positions about the axis of symmetry. In this modification, the first point is moved to the symmetrical position, whereas the second point is fixed.

24 Claims, 38 Drawing Sheets

FIG.4(A)
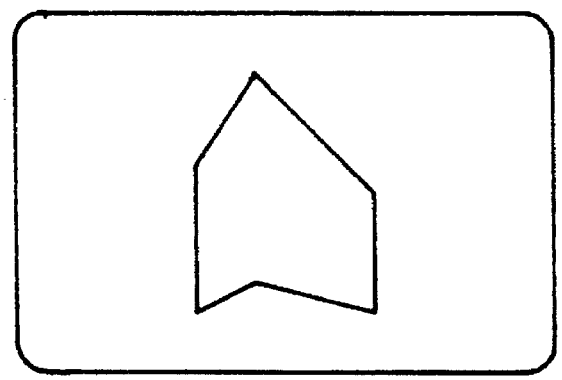
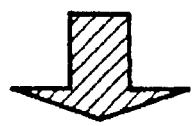
FIG.4(B)
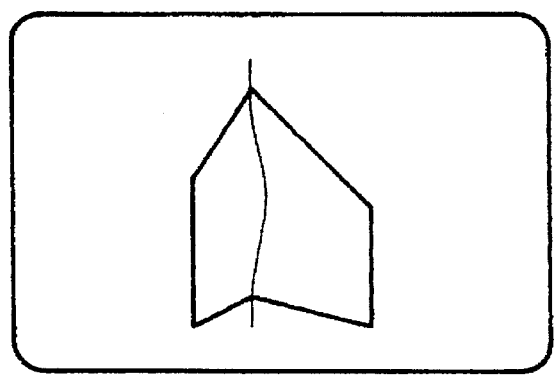
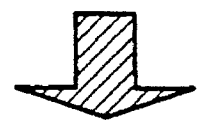
FIG.4(C)
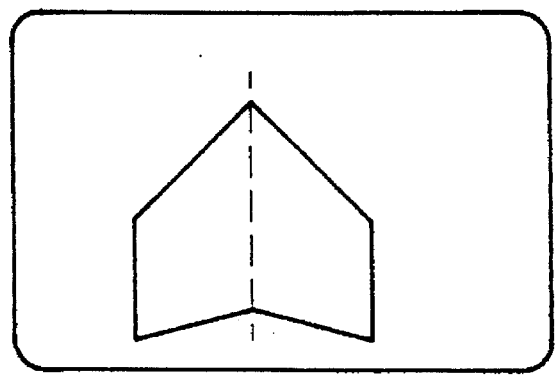

AXIS OF SYMMETRY

AXIS OF SYMMETRY

AXIS OF SYMMETRY

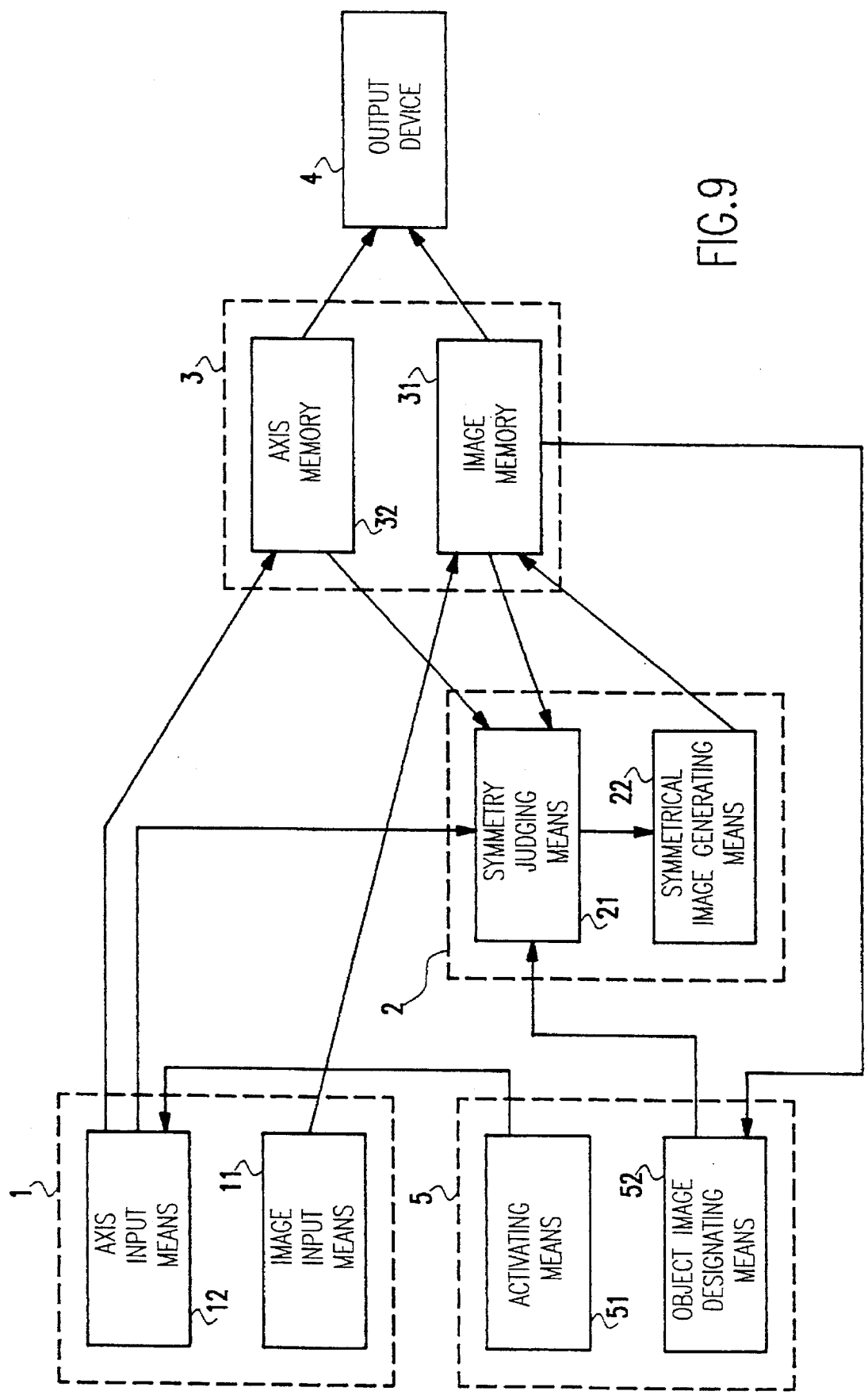

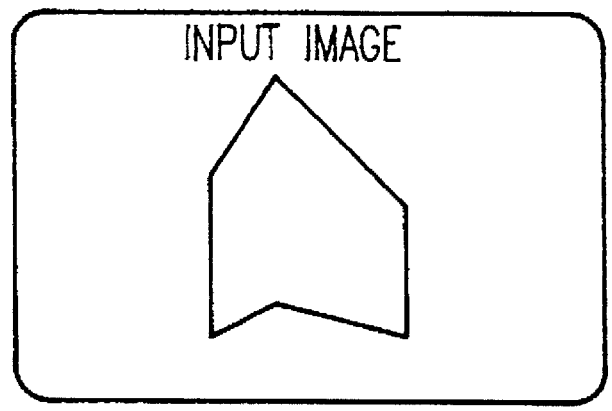
FIG.23(A)
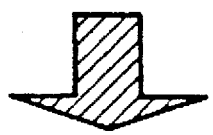
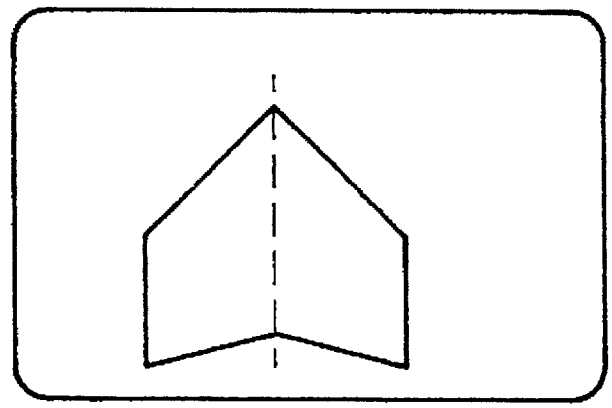
FIG.23(B)

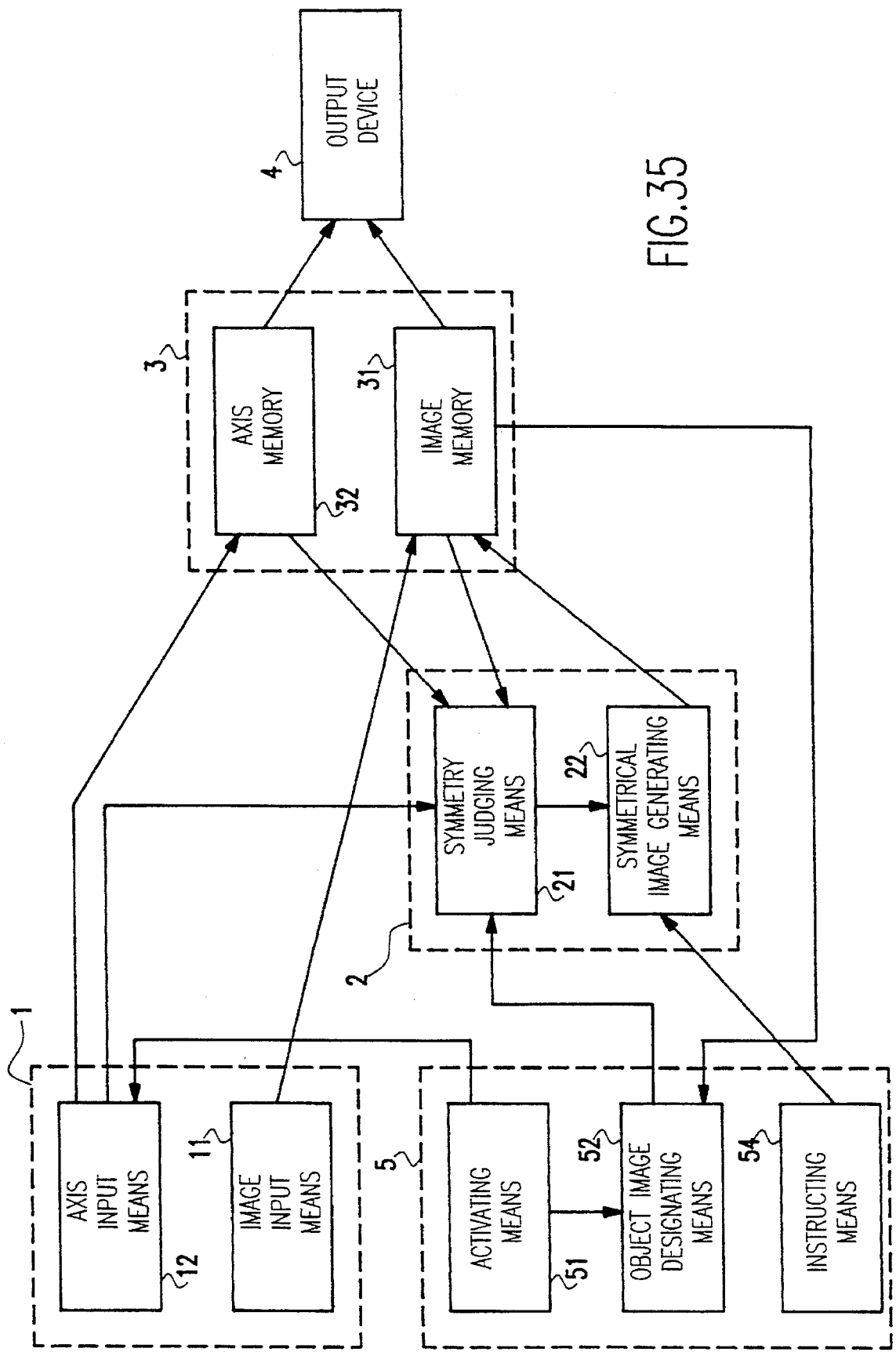

METHOD FOR FORMING A SYMMETRICAL IMAGE

BACKGROUND OF THE INVENTION

The present invention relates to an image processing system, and more particularly to an image processing system for shaping an image (e.g., an approximately symmetrical image) into a symmetrical image.

In this specification, "symmetry" means "axial symmetry."

In this specification, "control points" refers to points defining the shape of an image. In the case of a polygon, the control points may be vertices of the polygon. In the case of Bezier curves or spline curves, "control points" has the meaning commonly used in this field. The control points of various curves are disclosed in Foley, van Dam, Feiner & Hughes, "Computer Graphics," Addison-Wesley Publishing Company, Reading, Pa., 1992, pp. 471–532.

An example of the conventional image processing system having such a function is disclosed in "Explanation of Hanako Ver. 2", 4th print, 2nd Edition, May 14, 1990, K. K. Justsystem, pp. 177. In this conventional system, a symmetrical image is generated by the following steps.

Referring to FIG. 1(a), in a first step, a half image is input by an operator using a pointing device.

Referring to FIG. 1(b), in a second step, the operator directs the performance of a "mirror" command.

Referring to FIG. 1(c), a position of an axis of symmetry is determined.

Referring to FIG. 1(d), a mirror image of the half image is generated and joined to the half image to produce an entire (e.g., a whole) image having a symmetrical shape.

However, in this conventional system, the symmetrical image produced is frequently quite different from that which the operator intends, because the operator cannot visualize the entire image from simply viewing the half image.

SUMMARY OF THE INVENTION

In view of the aforementioned problems of the conventional system, one object of the present invention is to generate a symmetrical image from an entire image having an approximately symmetrical shape.

Another object of the present invention is to determine whether an input image is approximately symmetrical before the symmetrical image is generated.

Yet another object of the present invention is to automatically determine the position and the direction of the axis of symmetry of the input image.

Yet another object of the present invention is to select some images as object images from the input images and to generate symmetrical images from the object images.

Yet another object of the present invention is to allow the operator to choose a specific method from a plurality of methods of symmetrical image generation.

According to a method of the present invention, a symmetrical image is generated from an object image having a plurality of control points. Unlike the conventional system receiving a half image, the object image is an entire or whole image. The method is for use with a computer system including input and output devices. The method comprises the following steps.

In a first step, image data is input from the input device. The image data includes information indicative of positions of the control points.

In a second step, an axis of symmetry of the object image is determined.

In a third step, a first control point is paired with a second control point having a symmetrical relationship with the first control point.

In a fourth step, the image data is modified so that the first and second control points have symmetrical positions about the axis of symmetry.

In the third step, it may be judged whether the object image has an approximately symmetrical configuration. This operation may be implemented by the following steps.

In a first step is calculated a distance between the axis of symmetry and a middle point of a line segment between the first and second control points.

In a second step, an average distance is calculated by calculating the distance for different pairs of control points of the plurality of control points.

In a third step, it is determined whether the average distance is less than a predetermined value.

In a fourth step, an angle is calculated between a line perpendicular to the axis of symmetry and a line segment between the first and second control points.

In a fifth step, an average angle is calculated by calculating the angle for different pairs of control points of the plurality of control points.

In a sixth step, it is determined whether the average angle is less than a predetermined value.

The axis of symmetry may be automatically generated from axis data indicating approximate position or direction of the axis of symmetry. The axis data may be input by the operator.

BRIEF DESCRIPTION OF THE DRAWINGS

Other objects, features and advantages of the present invention will become more apparent when the following description is read in conjunction with the accompanying drawings, wherein:

FIGS. 4(a) to 4(c) illustrate screen images displayed in steps A1, A2, and A4 in FIG. 3, respectively.

FIG. 9 is a block diagram of a second embodiment of the present invention.

FIGS. 23(a) and 23(b) illustrate screen images displayed in steps A1 and A4 in FIG. 21, respectively.

FIG. 35 is a block diagram of an eleventh embodiment of the present invention.

In these drawings, the same reference numerals depict the same parts, respectively.

DETAILED DESCRIPTION OF THE PREFERRED EMBODIMENTS

In the following exemplary embodiments, polygons are processed as the images. The control points are the vertices of the polygon. Of course, images having shapes other than polygonal shapes can also be suitably processed by the invention.

Next is described the first embodiment of the present invention.

Figure 1:
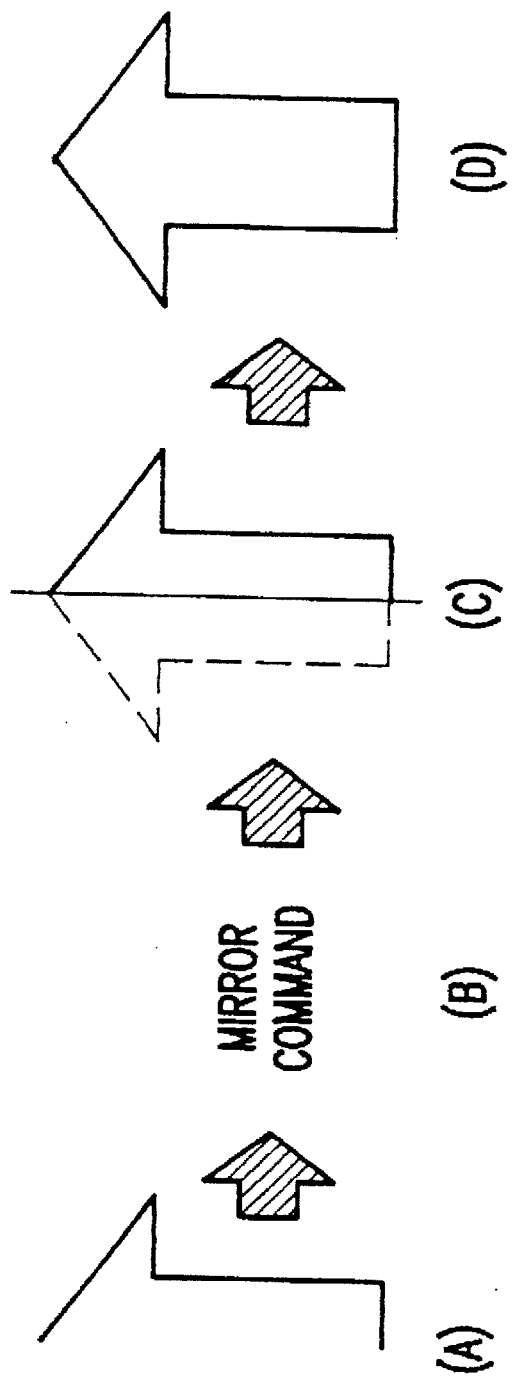
FIGS. 1(a) to 1(d) illustrate steps of a conventional method for generating a symmetrical image.
Figure 2:
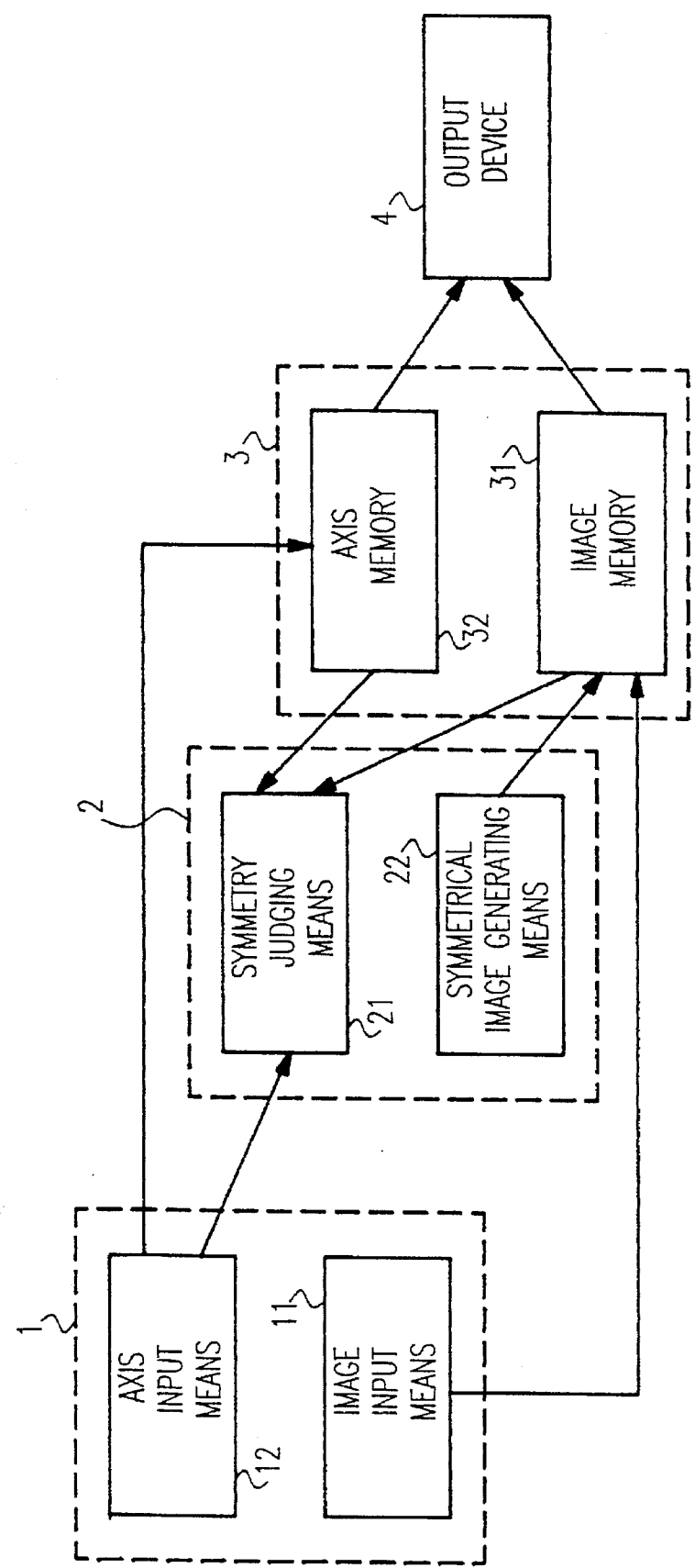
FIG. 2 is a block diagram of a first embodiment of the present invention.

Referring to FIG. 2, the first embodiment of the present invention includes an input device 1, a data processor 2, a memory device 3, and an output device 4.

The input device 1 is preferably a pointing device such as a mouse, a tablet, a touch screen, a trackball, or a light pen. The input device 1 can be implemented by a key board.

The input device 1 includes image input means 11 and axis input means 12, which may be implemented by programs executed by the data processor 2.

The image input means 11 receives the information representing a shape of an image (hereinafter "image data") from the operator. The image data includes positions of the control points (e.g., vertices of the polygon). The image data further includes information indicating pairs of control points to be connected by a line segment. The image input means 11 stores the image data in an image memory 31 in the memory device 3.

The axis input means 12 receives an approximate position and direction of an axis of symmetry from the operator. The axis input means 12 calculates substantially an exact position and direction of the axis of symmetry based on the image data. The data indicative of the position and the direction of the axis (hereinafter "axis data") is stored in an axis memory 32 in the memory device 3.

The data processor 2 includes a symmetry judging means 21 and a symmetrical image generating means 22, which are implemented by programs executed by the data processor 2.

The symmetry judging means 21 receives the image data and the axis data from the image memory 31 and axis memory 32, respectively. The symmetry judging means 21 determines whether the image defined by the image data is approximately symmetrical by referring to the image data and the axis data.

The symmetrical image generating means 22 modifies the image data so that the image has a symmetrical shape. The modified image data is stored in the image memory 31.

The output device 4 is preferably a cathode-ray tube (CRT) but, of course, can be any output device such as a printer for printing a hard-copy output, or the like. The image and other information are displayed by the output device 4. The operator inputs data and instructions while viewing the information displayed by the display device 4.

Next is described the operation of the first embodiment.

Figure 3:
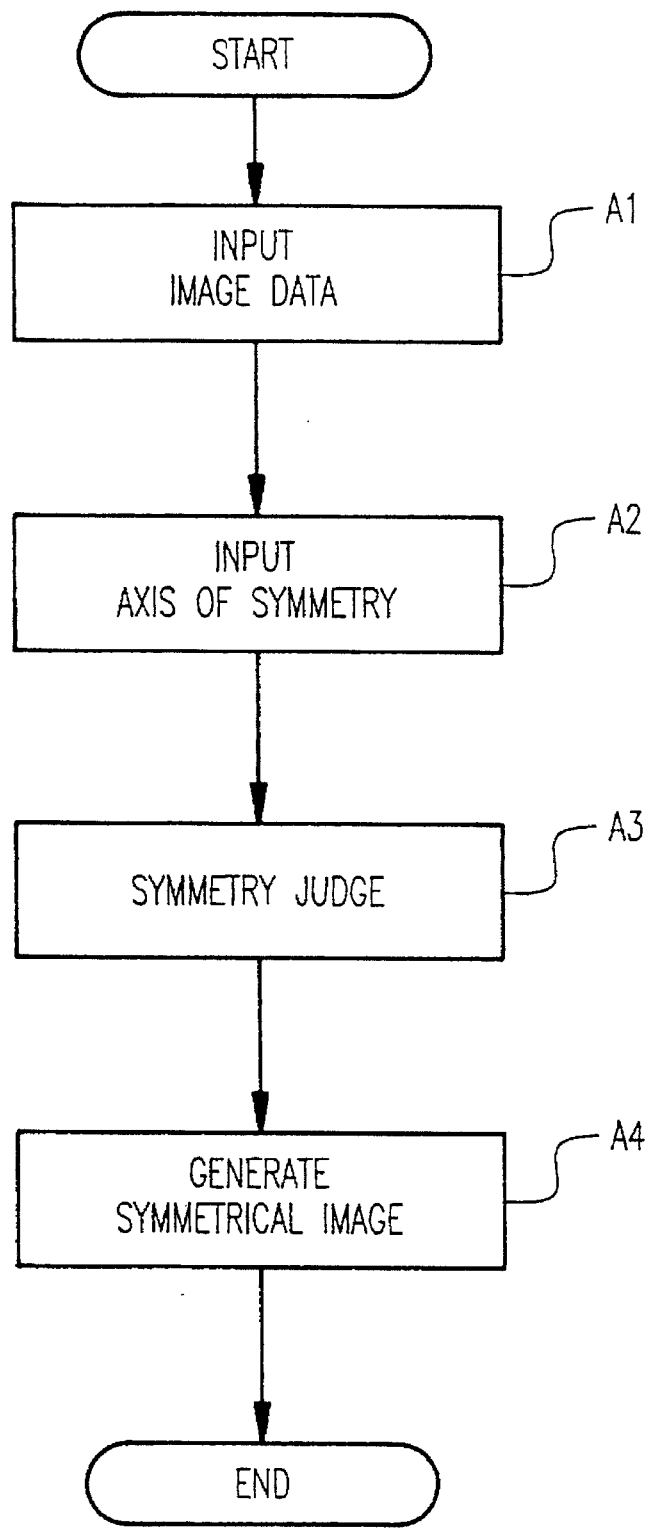
FIG. 3 is a flowchart showing the operation of the first embodiment.

Referring to FIGS. 3 and 4(a), in step A1, the image input means 11 receives the image data from the operator. The image data can be input by various methods to include, for example, designating the positions of the control points (e.g., vertices) using the pointing device, and drawing the contour of the polygon using the pointing device.

The image data may include an angle of the image, lengths of the sides of the polygon, or a type of the image (e.g., straight lines or curved lines).

The image data is stored in the image memory 31. The input image is displayed by the output device 4.

Referring the FIGS. 3 and 4(b), in step A2, the axis input means 12 receives from the operator an approximate position and direction of the axis of symmetry. The axis input means 12 calculates an exact position and direction of the axis (the "axis data") and stores the axis data in the axis memory 32. Detailed operation of the axis input means is described below.

Referring to FIG. 3, in step A4, the symmetry judging means 21 determines whether the input image is approximately symmetrical. If the input image is asymmetrical, the operation is terminated. Otherwise, step A4 is executed. The detailed operation of the symmetry judging means 21 is described below.

Referring to FIGS. 3 and 4(c), the symmetrical image generating means 22 modifies the image data in image memory 31 so that the image has a symmetrical shape. The shaped image is displayed on the output device 4. The detailed operation of the symmetrical image generating means 22 is described below.

Next is described the operation of the axis input means 12.

Figure 5A:
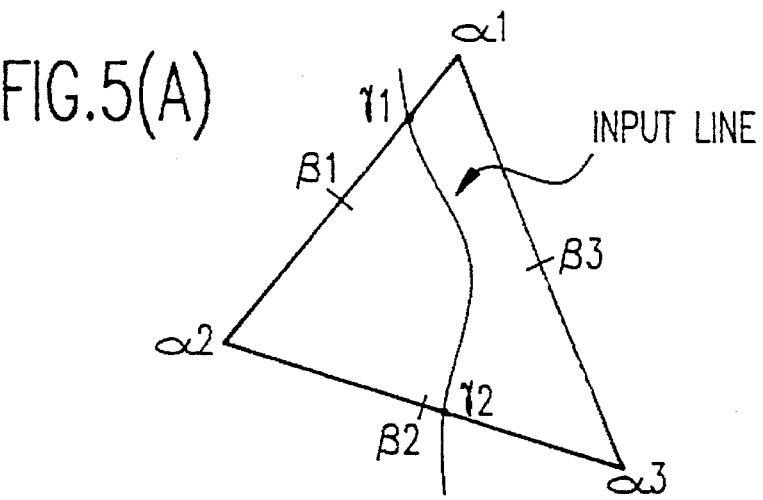
FIGS. 5(a) and 5(b) illustrate steps of an axis determining process performed by the axis input means 12.

Referring to FIG. 5(a), in a first step, the axis input means 12 calculates the first and second points γ1 and γ2 which are the points of intersection of the input image and the axis input by the operator. The axis input by the operator need not necessarily be a straight line as shown in FIG. 5(a).

Figure 5B:
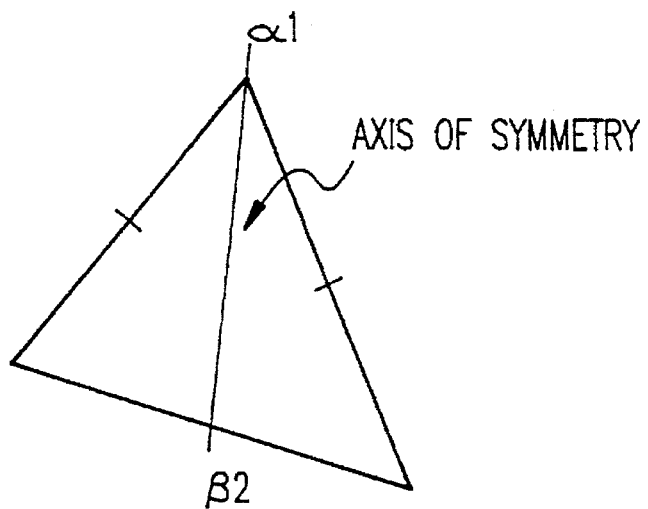

Referring to FIG. 5(b), in a second step, the axis input means 12 selects first and second intersecting points among the control points αi and middle points βi of the sides of the image. The first and second points are selected so that the first and second points are closest to the first and second points γ1 and γ2, respectively. In the case depicted in FIG. 5(a), control point α1 and middle point β2 are the first and second intersecting points, respectively.

The axis input means 12 identifies the line segment between the first and second intersecting points as the axis of symmetry. The axis input means 12 stores in the axis memory 32 the positions of the first and second intersecting points. The position and the direction of the axis of symmetry can be obtained by referring to the position of the first and second intersecting points.

Figure 5C:
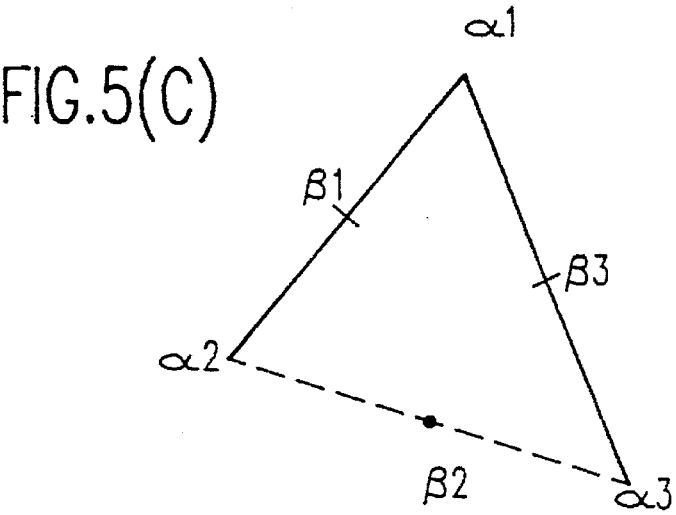
FIG. 5(c) illustrates a step of another axis determining process.

Referring to FIG. 5(c), when the input image has edges, the axis input means 12 identifies the middle point between the edges as one of the first and second intersecting points without calculation. In the case depicted in FIG. 5(c), the input image has edges α2 and α3. Therefore, a middle point β2 between the endpoints α2 and α3 is identified as one of the first and second intersecting points.

Next is described the operation of the symmetry judging means 21.

Figure 6:
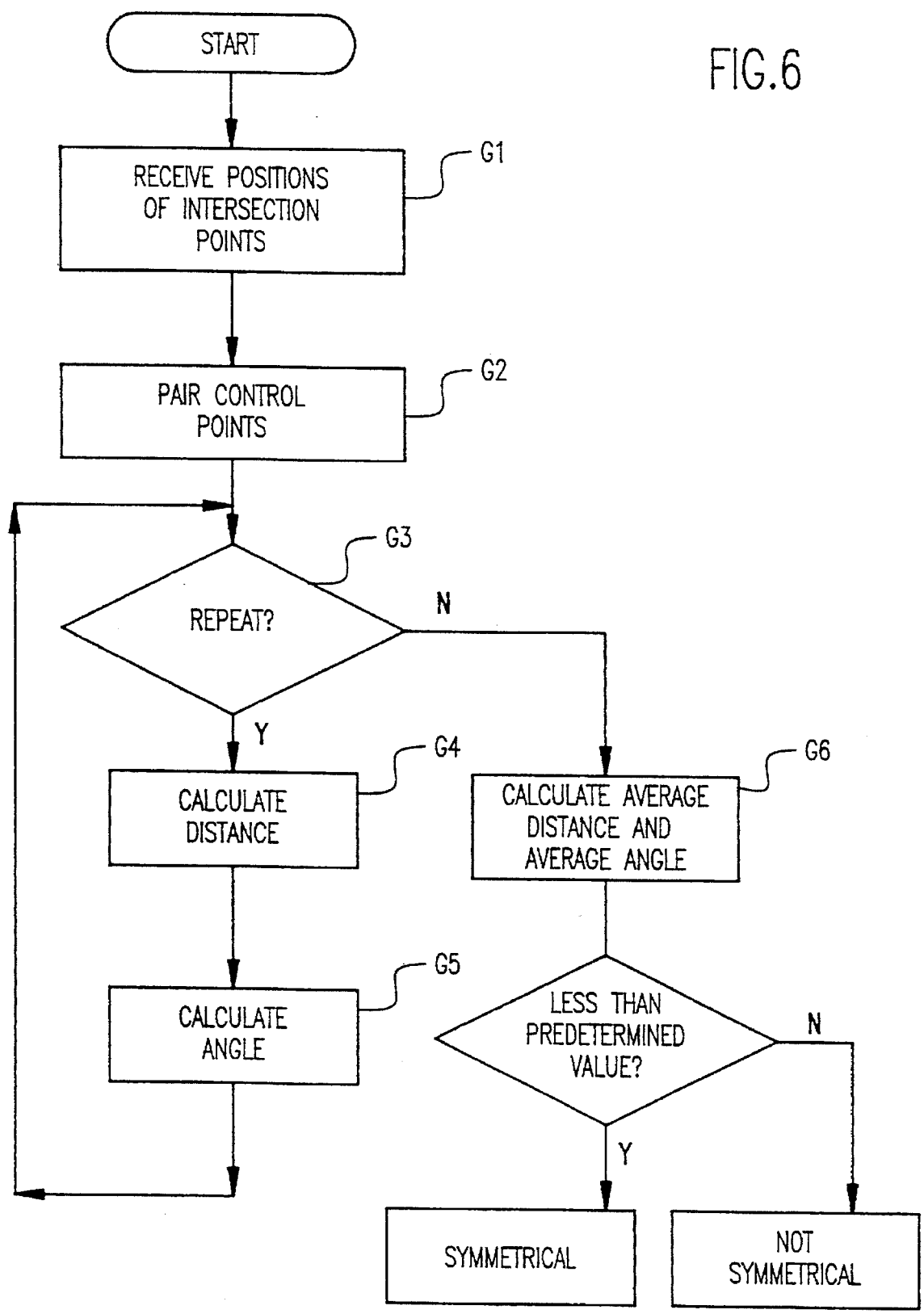
FIG. 6 is a flowchart showing the operation of the symmetry judging means 21.
Figure 7:
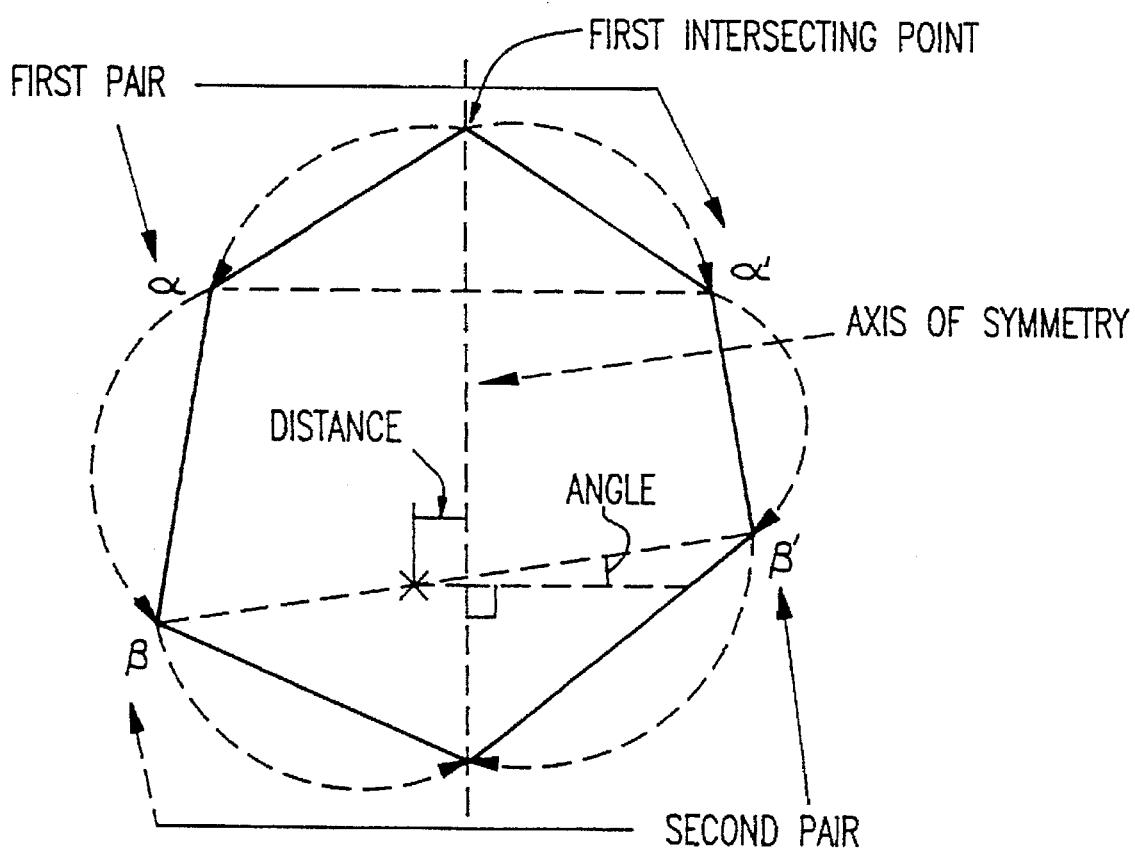
FIG. 7 illustrates the operation of the symmetry judging means 21 shown in FIG. 6.

Referring to FIGS. 6 and 7, in step G1, the symmetry judging means 21 reads the positions of the first and second intersecting points out of the axis memory 32.

In step G2, the symmetry judging means 21 pairs together the control points. Specifically, the judge means 21 performs a "pairing travel" operation among the control points by moving first and second search points from one control point to another control point along the sides of the image.

The first and second search points travel in different directions from the first intersecting point. The symmetry judging means 21 pairs the control points that the first and second search points encounter in the n-th movement.

For example, in the case depicted in FIG. 7, the judge means 21 pairs points α and α' that are encountered in the first movement. The judge means 21 also pairs points β and β' that are encountered in the second movement.

In step G4, the symmetry judging means 21 calculates the distance between the axis of symmetry and the middle point of a line segment between the paired control points.

In step G5, the symmetry judging means 21 calculates an angle between a line perpendicular to the axis of symmetry and the line segment between the paired control points.

Steps G4 and G5 are repeated until these steps are performed for all the pairs of control points (step G3). When steps G4 and G5 have been performed for all the pairs of control points, step G6 is executed.

In step G6, the symmetry judging means 21 calculates an average distance by averaging the distances obtained in step G4. The symmetry judging means 21 also calculates an average angle by averaging the angles obtained in step G5.

In step G7, the symmetry judging means 21 determines whether the average distance and the average angle are less than predetermined values. If either the average distance or the average angle equals or exceeds the respective predetermined values, the symmetry judging means 21 determines that the input image is not symmetrical and terminates the operation. Otherwise, the symmetry judging means 21 determines that the input image is approximately symmetrical, and the program branches to step A4 in FIG. 3. The predetermined values are set according to the designer's needs.

Next is described the operation of the symmetrical image generating means 22. Various methods can be used for generating a symmetrical image from an input image having an approximately symmetrical shape.

In the following examples, the generating means 22 adjusts positions of control points α and α', which are paired by the symmetrical judge means 21 so that points α and α' have symmetrical positions. In the following examples, the axis of symmetry is assumed to coincide with the Y axis for the sake of simplicity, but of course the present invention is not limited to such an axis of symmetry.

Figure 8A:
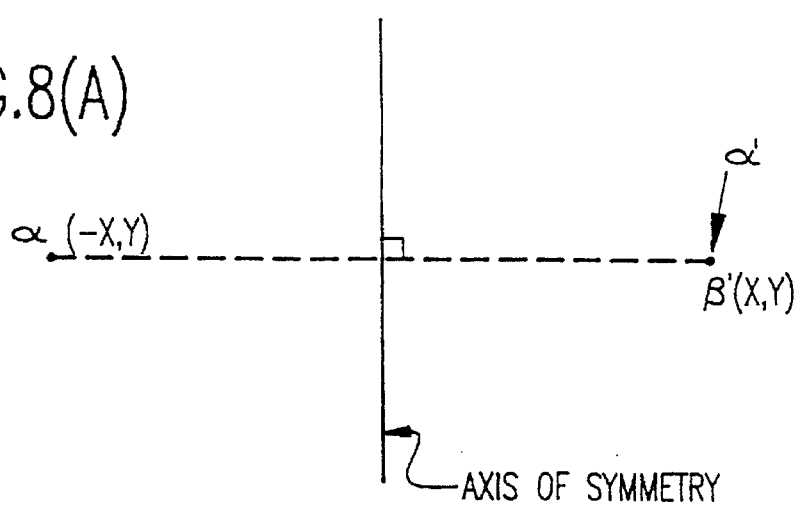
FIGS. 8(a) to 8(c) illustrate three methods of generating a symmetrical image.

Referring to FIG. 8(a), in a first method, the position of the right control point α' is adjusted, whereas that of the left control point α is fixed. Specifically, when the position of the left control point α is (-x,y) (e.g., fixed), the position of the right control point α' is adjusted to β' (x,y).

Similarly, the position of the left control point α can be adjusted, whereas that of the right control point α' is fixed.

The control point that is closer to the axis of symmetry also may be moved, whereas another point is fixed, and vice versa.

Figure 8B:
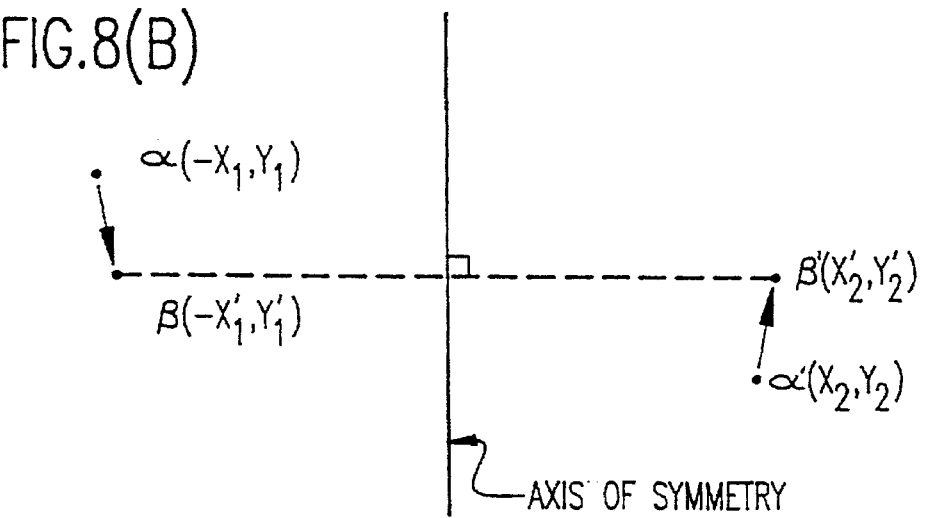

Referring to FIG. 8(b), in a second method, the right and left control points α(-x1,y1) and α'(x2,y2) are moved to points β(-x1',y1') and β'(x2',y2'), respectively. Specifically, x1',y1',x2', and y2' are given below.

$$x1'=x2'=(x1+x2)/2,$$

$$y1'=y2'=(y1+y2)/2.$$

Figure 8C:
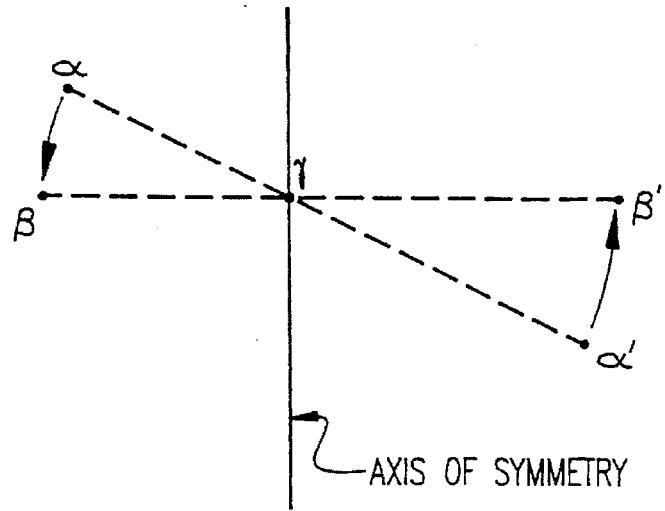

Referring to FIG. 8(c), in a third method, the right and left points α and α' are rotated about point γ and moved to points β and β', respectively, so that the line segment β,β' is perpendicular to the axis of symmetry. The point γ is the point of intersection of the line segment α, α' and the axis of symmetry. After this rotation, the second method is performed for points β and β' to bring them into symmetrical positions.

The symmetrical image generating means 22 performs the aforementioned method for all the pairs of the control points.

Thus, the control points are positioned symmetrically about the axis of symmetry, and the input image is shaped to have a symmetrical shape. The symmetrical image generating means 22 modifies the image data in image memory 31 so that the image data reflects the aforementioned positional adjustment of the control points.

As stated above, in the first embodiment, the operator inputs an entire image having an approximately symmetrical shape instead of a half image as in the conventional systems. Thereafter, a symmetrical image is automatically generated from the input image. Therefore, the operator can easily observe the symmetrical image produced.

Next is described the second embodiment of the present invention. In the second embodiment, a plurality of images are input by the input device 1. Thereafter, an image is selected as an object image from the input images. The process of the first embodiment is performed for the object image.

Referring to FIG. 9, the second embodiment of the present invention includes an instructing device 5 in addition to the elements of the first embodiment.

The instructing device 5 is preferably a pointing device, a touch panel attached to the output device 4, or a keyboard. The instructing device 5 may be implemented by the same device as the input device 1.

The instructing device 5 includes activating means 51 for activating the system to generate a symmetrical image. The instructing device 5 further includes object image designating means 52 for designating one image stored in the image memory as an object image for symmetrical image generation.

Next is described the operation of the second embodiment.

Figure 10:
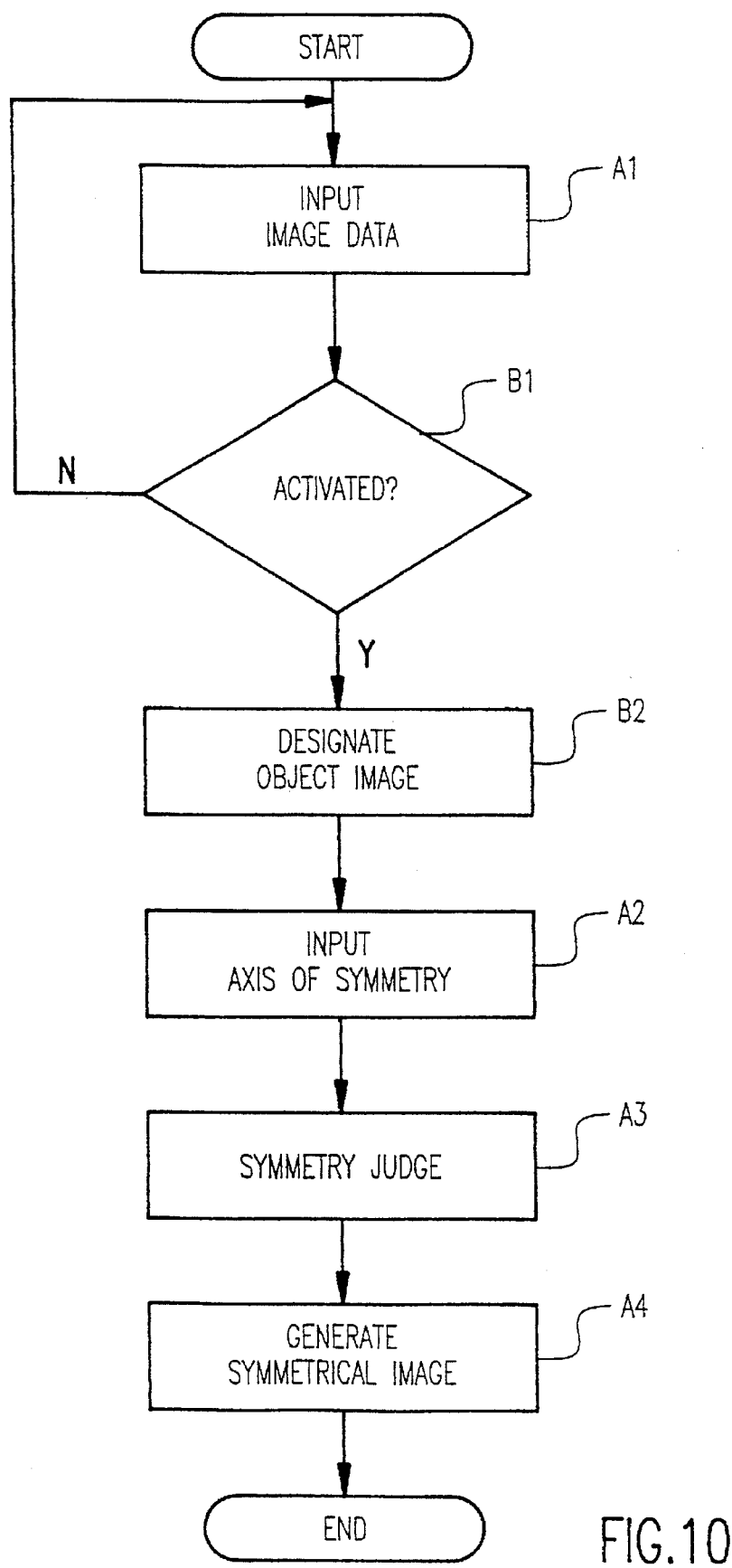
FIG. 10 is a flowchart showing the operation of the second embodiment.
Figure 11A:
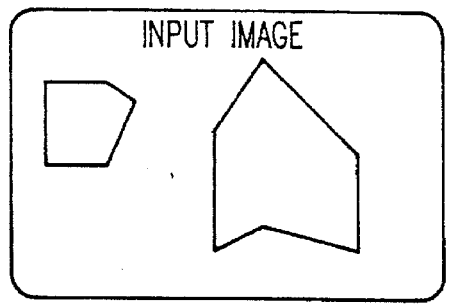
FIGS. 11(a) to 11(e) illustrate screen images displayed in steps A1, B1, B2, A2, and A4 in FIG. 10, respectively.

Referring to FIGS. 10 and 11(a), step A1 is the same as that of the first embodiment. In step A1, a plurality of images may be stored in the image memory 31.

Figure 11D:
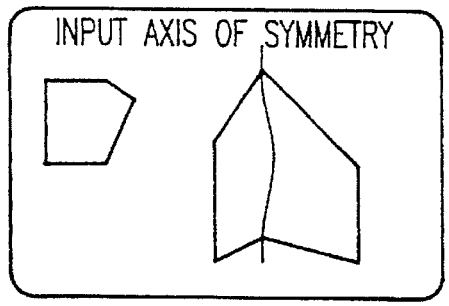
Figure 11B:
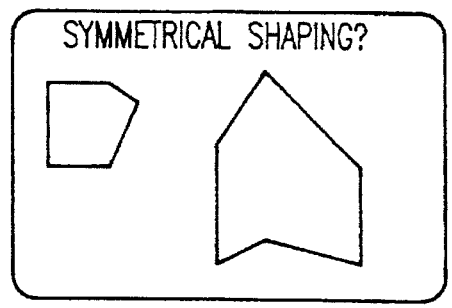

Referring to FIGS. 10 and 11(b), the activating means 51 waits for an instruction from the operator. When the activating means 51 receives the instruction to generate a symmetrical image, the activating means 51 activates the object image designating means 52 and the axis input means 12 to start the process of steps B2 to A4 depicted in FIG. 10. The operator may give the instruction by, for example, "clicking on an icon" displayed on the output device 4 using the pointing device. When the activating means 51 does not receive the instruction, step A1 is repeated.

Figure 11E:
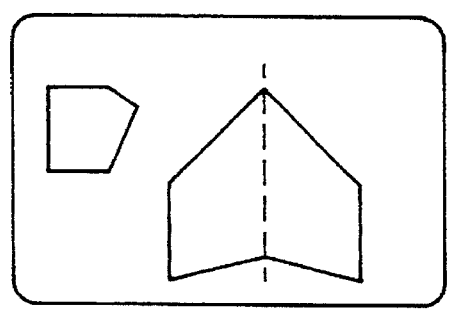
Figure 11C:
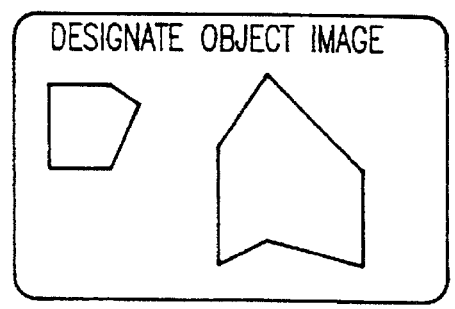

Referring to FIGS. 10 and 11(c), in step B2, the object image designating means 52 designates one image stored in the image memory 31 as an object image according to an instruction from the operator. The operator may give this instruction by, for example, putting a cursor on the object image with the pointing device and actuating the same. In the case depicted in FIG. 11(c), the image on the right is designated as the object image.

Referring to FIGS. 10, 11(d), and 11(e), in steps A2 to A4, a symmetrical image is generated from the object image as steps A2 to A4 of the first embodiment.

Next is described the third embodiment of the present invention. In the third embodiment, a group of input images are designated as object images.

The third embodiment has the same elements as the second embodiment.

Next is described the operation of the third embodiment.

Figure 12:
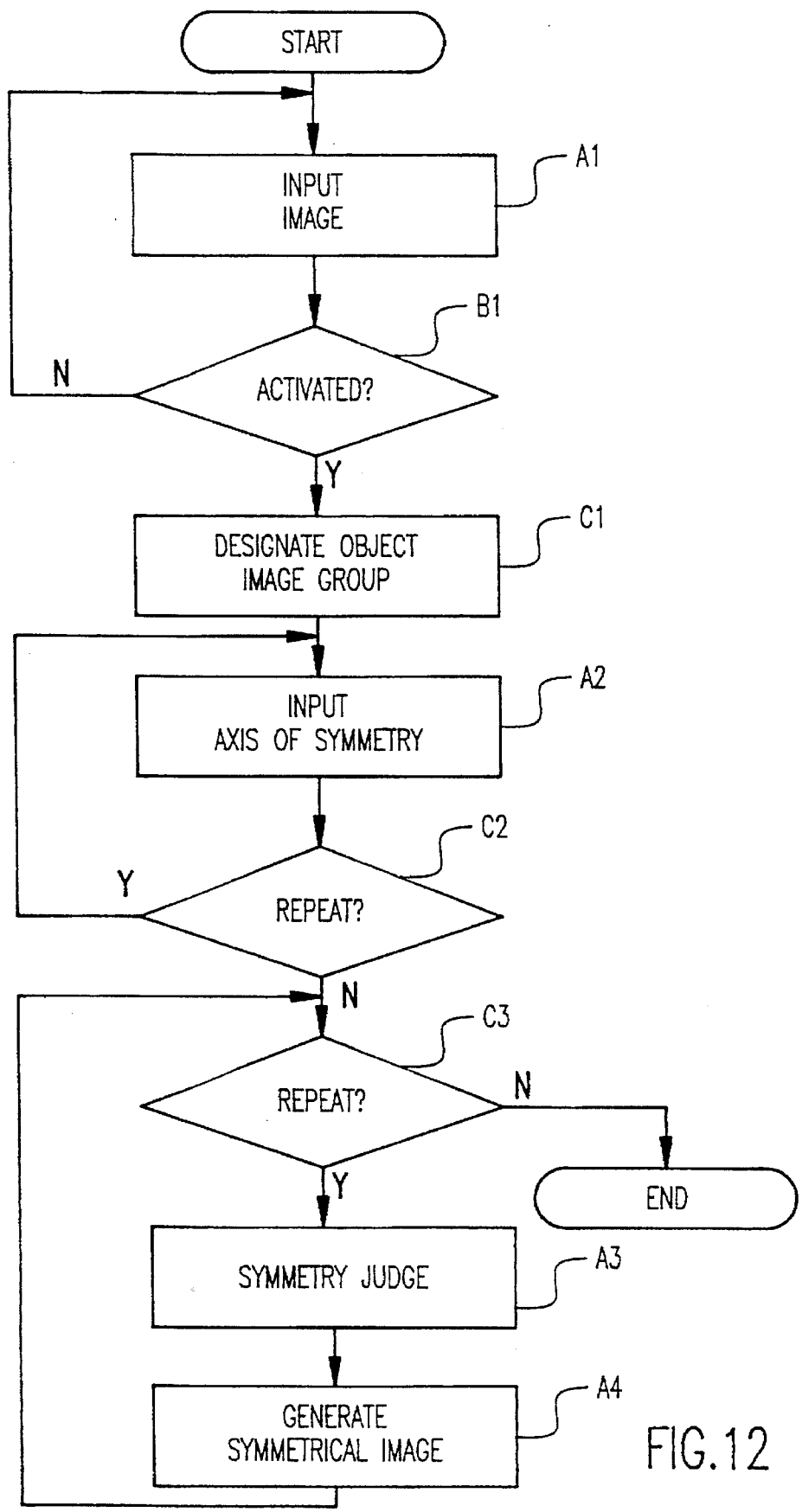
FIG. 12 is a flowchart showing the operation of a third embodiment of the present invention.
Figure 13A:
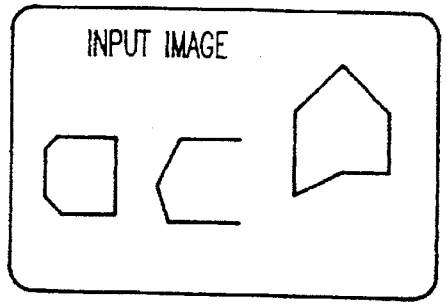
FIGS. 13(a) to 13(e) illustrate screen images displayed in steps A1, B1, C1, A2, and A4 in FIG. 12, respectively.
Figure 13D:
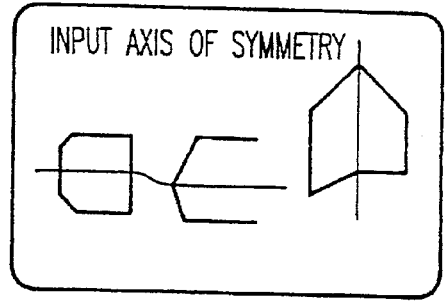
Figure 13B:
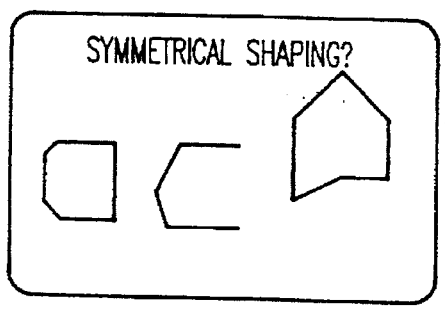

Referring to FIGS. 12, 13(a), and 13(b) in steps A1 and B1, a plurality of images are input as steps A1 and B1 of the second embodiment.

Figure 13E:
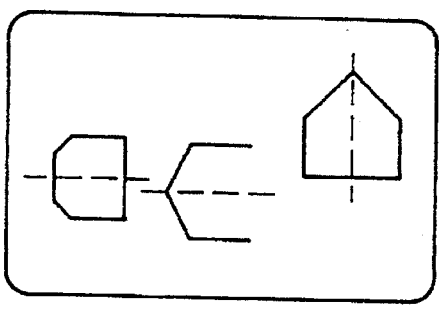
Figure 13C:
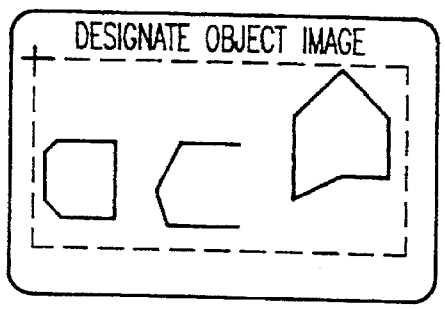

Referring to FIGS. 12 and 13(c), in step C1, the object image designating means 52 designates a group of images as object images according to an instruction from the operator. The operator may give the instruction by drawing a rectangle with the pointing device so that the rectangle surrounds the object images. The designating means 52 identifies the images designated by the operator referring to the image data in the image memory 31.

Referring to FIGS. 12 and 13(d), in step A2, the axes of symmetry of the object images are input as in step A2 of the first embodiment. In step C2, step A2 is repeated until A2 is performed for all the object images. When the axes are input for all the object images, step C3 is executed.

Referring to FIGS. 12 and 13(e), in steps C3, A3, and A4, the same operation as in steps A3 and A4 of the first embodiment is performed for the object images. In step C3, steps A3 and A4 are repeated until these steps are performed for all the object images. When steps A3 and A4 are performed for all the object images, the operation is terminated.

Next is described a fourth embodiment of the present invention. In the fourth embodiment, the object images are identified automatically referring to the position of the axis of symmetry.

Figure 14:
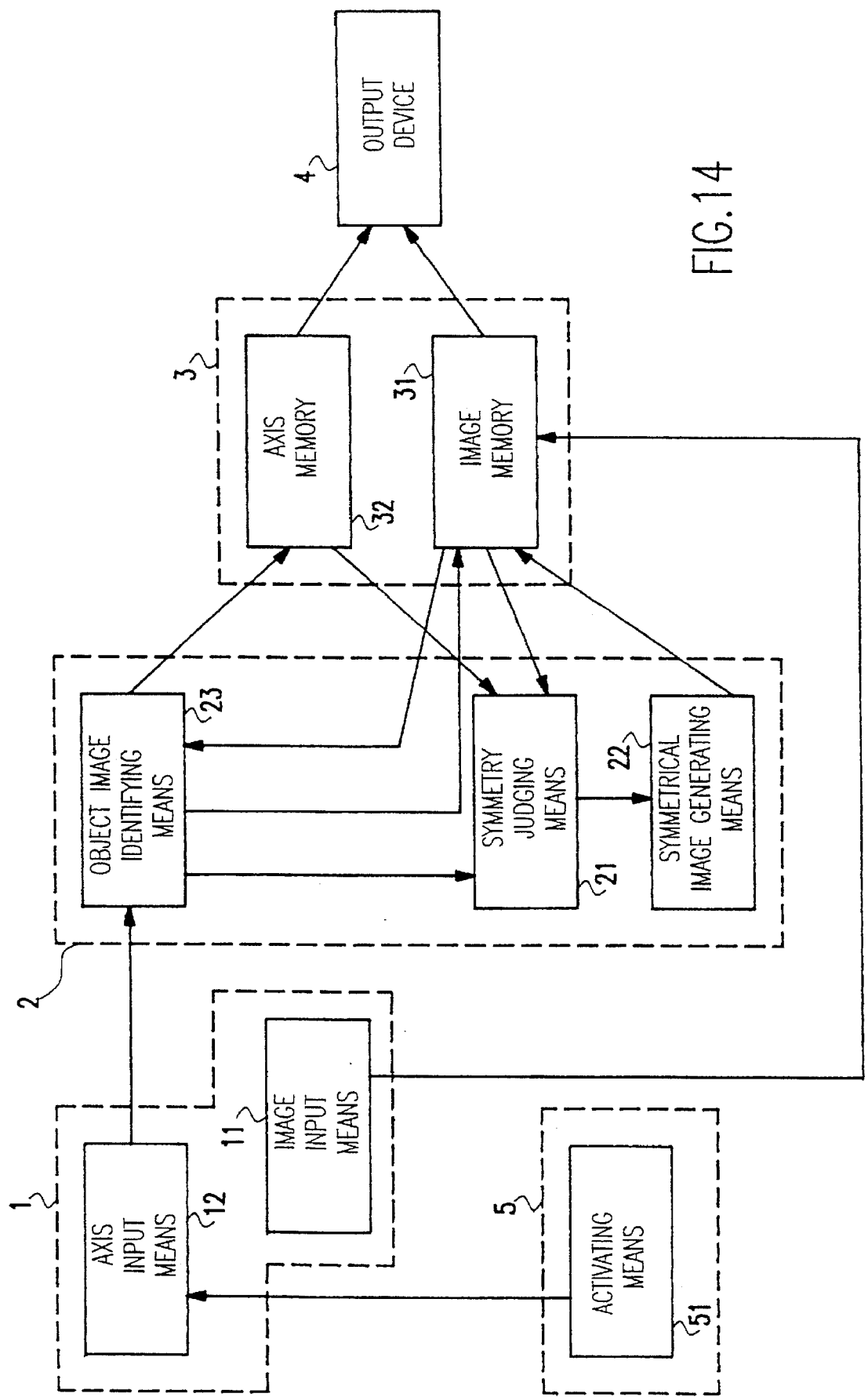
FIG. 14 is a block diagram of a fourth embodiment of the present invention.

Referring to FIG. 14, the fourth embodiment includes the elements of the second embodiment except for object image designating means 52. Instead of object image designating means 52, the fourth embodiment includes object image identifying means 23.

The object image identifying means 23 identifies an object image among the images stored in image memory 31 referring to the axis data in the axis memory 32. Specifically, the object image identifying means 23 identifies the image intersecting the axis of symmetry as the object image.

Next is described the operation of the fourth embodiment.

Figure 15:
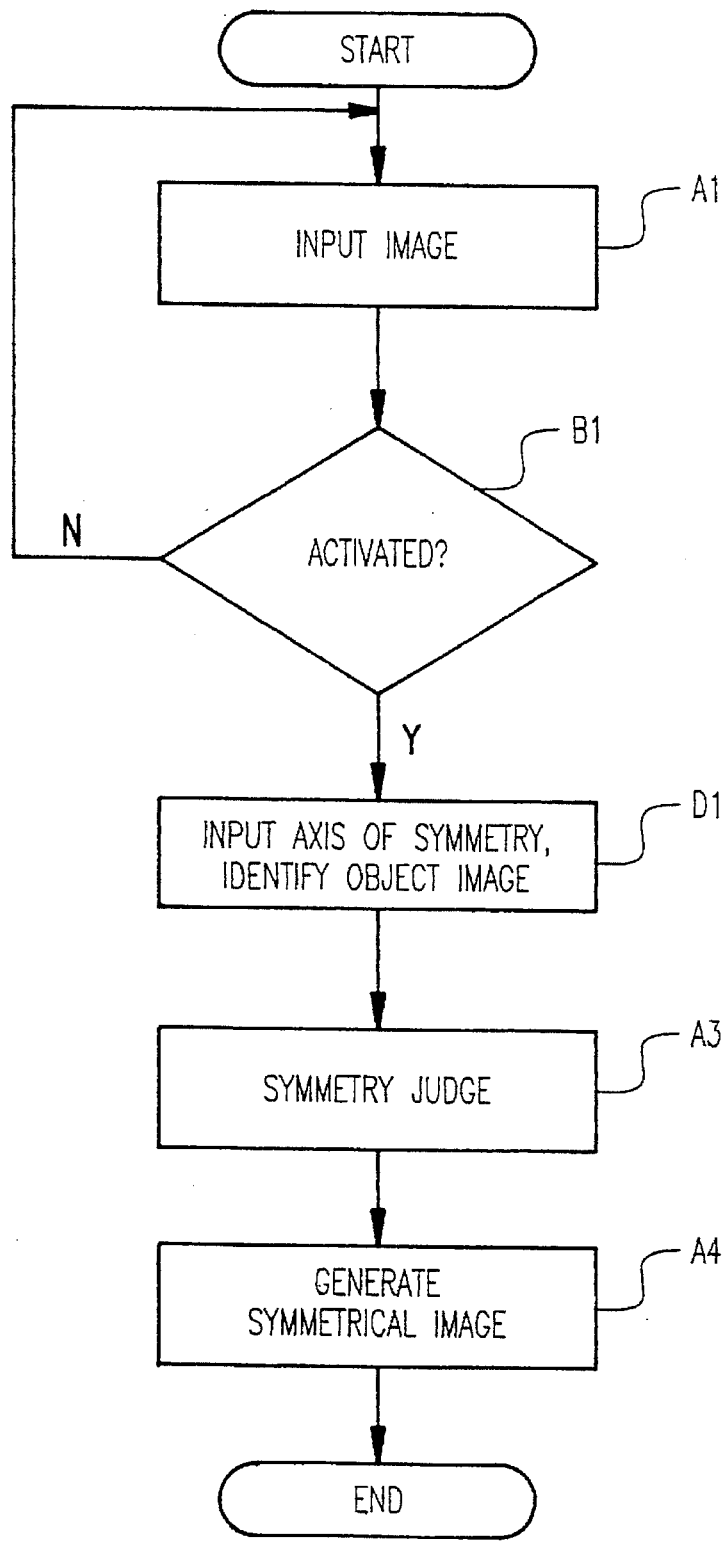
FIG. 15 is a flowchart showing the operation of the fourth embodiment.
Figure 16A:
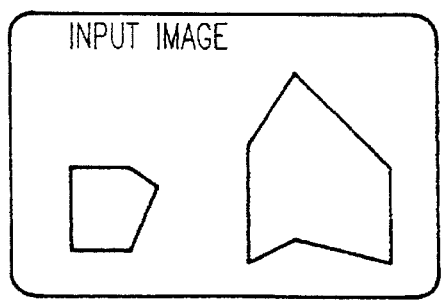
FIGS. 16(a) to 16(d) illustrate screen images displayed in steps A1, B1, D1, and A4 in FIG. 15, respectively.
Figure 16C:
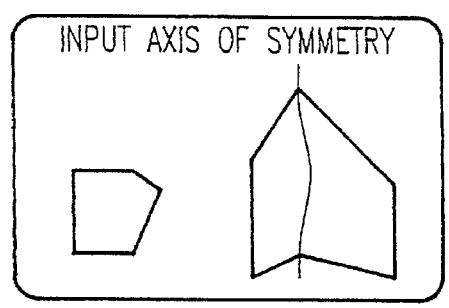
Figure 16B:
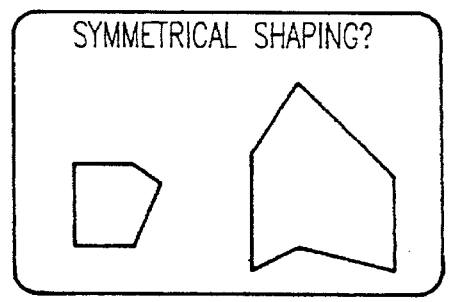

Referring to FIGS. 15, 16(a), and 16(b), in steps A1 and B1, a plurality of images are input as in steps A1 and B1 of the second embodiment.

Referring to FIGS. 15 and 16(c), in step D1, an axis of symmetry is designated by the operator as in step A2 of the first embodiment. Thereafter, the object image identifying means 23 identifies the image intersecting the axis of symmetry as an object image.

Figure 16D:
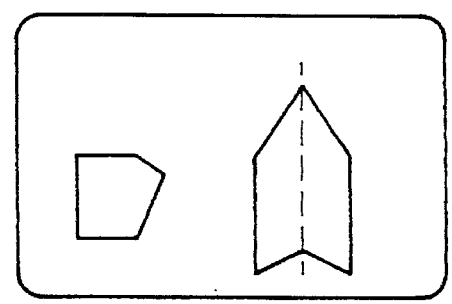

Referring to FIGS. 15 and 16(d), in steps A3 and A4, a symmetrical image is generated from the object image as in steps A3 and A4 of the first embodiment.

Next is described a fifth embodiment of the present invention. In the fifth embodiment, a plurality of object images are automatically identified referring to the positions of the axes of symmetry.

Figure 17:
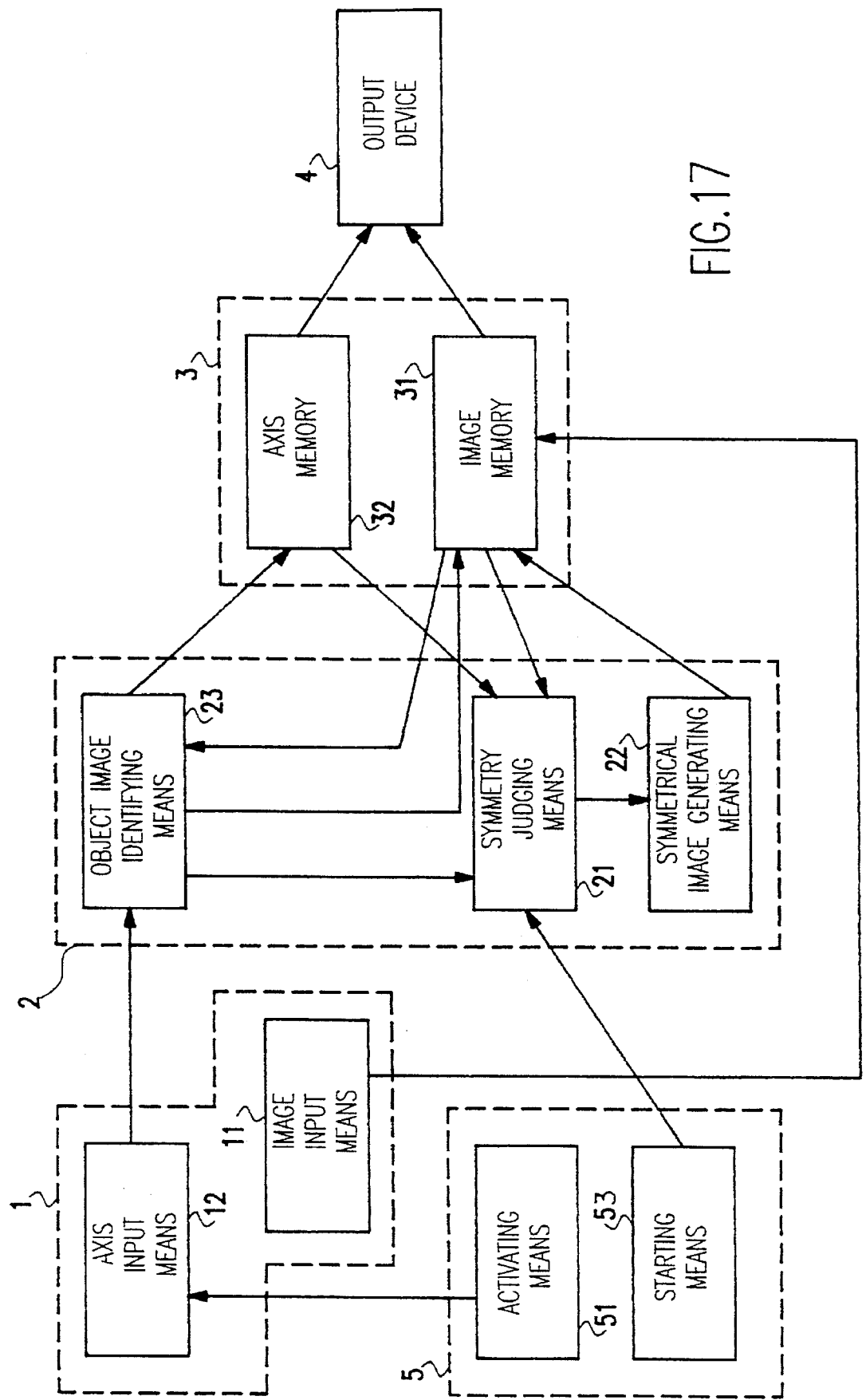
FIG. 17 is a block diagram of a fifth embodiment of the present invention.

Referring to FIG. 17, the fifth embodiment includes starting means 53 in addition to the elements of the fourth embodiment. The starting means 53 activates symmetry judging means 21 in response to an instruction from the operator.

Next is described the operation of the fifth embodiment.

Figure 18:
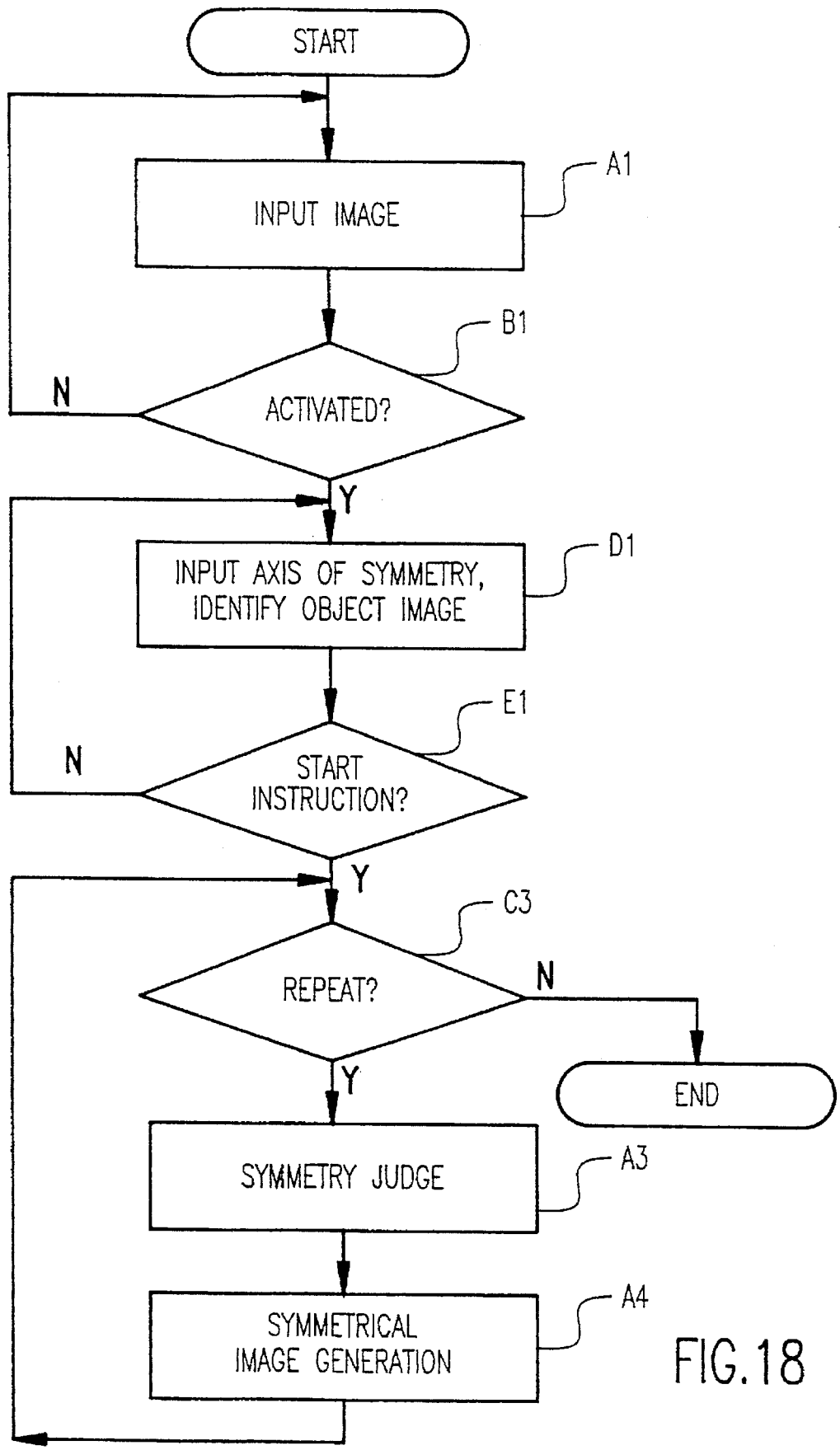
FIG. 18 is a flowchart showing the operation of the fifth embodiment.
Figure 19A:
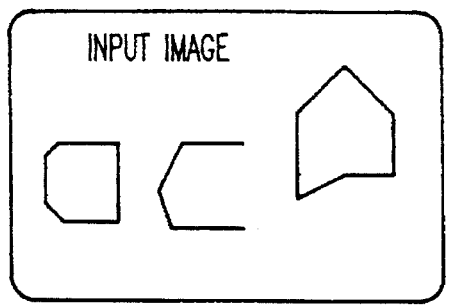
FIGS. 19(a) to 19(e) illustrate screen images displayed in steps A1, B1, D1, E1, and A4 in FIG. 18, respectively.

Referring to FIGS. 18 and 19(a), in step A1, images are input as in step A1 of the first embodiment.

Figure 19D:
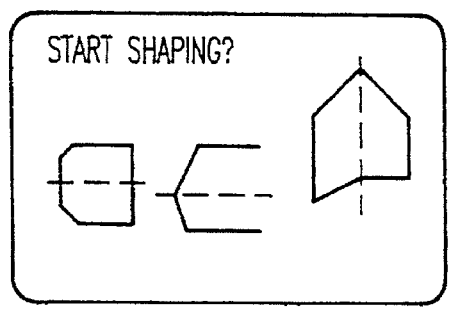
Figure 19B:
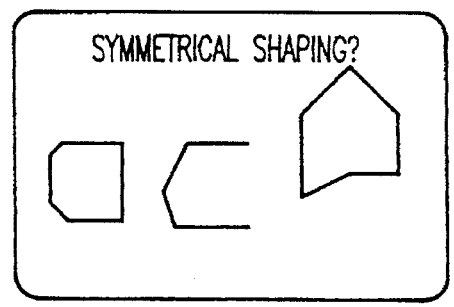

Referring to FIGS. 18 and 19(b), in step B1, the activating means 51 waits for an instruction from the operator as in step B1 of the second embodiment.

Figure 19E:
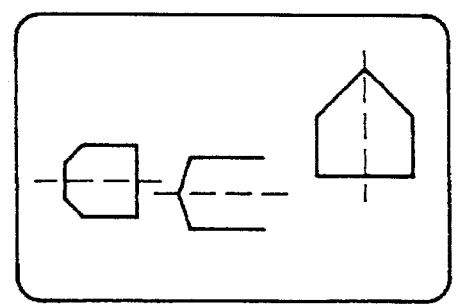
Figure 19C:
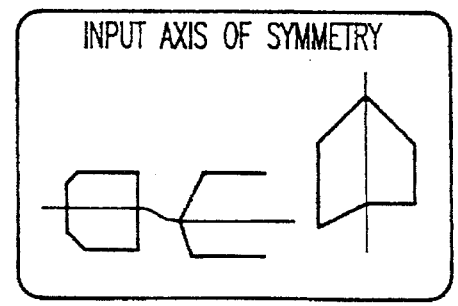

Referring to FIGS. 18 and 19(c), in step D1, an axis of symmetry is designated by the operator and an object image is identified as in step D1 of the fourth embodiment.

Referring to FIGS. 18 and 19(d), in step E1, step D1 is repeated until the starting means 53 receives from the operator an instruction for starting symmetrical image generation. By repeating step D1, a plurality of object images are identified.

Referring to FIGS. 18 and 19(e), in steps C3, A3, and A4, symmetrical images are generated from the object images as in steps C3, A3, and A4 of the third embodiment.

Next is described a sixth embodiment of the present invention. In the sixth embodiment, the axis of symmetry is generated automatically.

Figure 20:
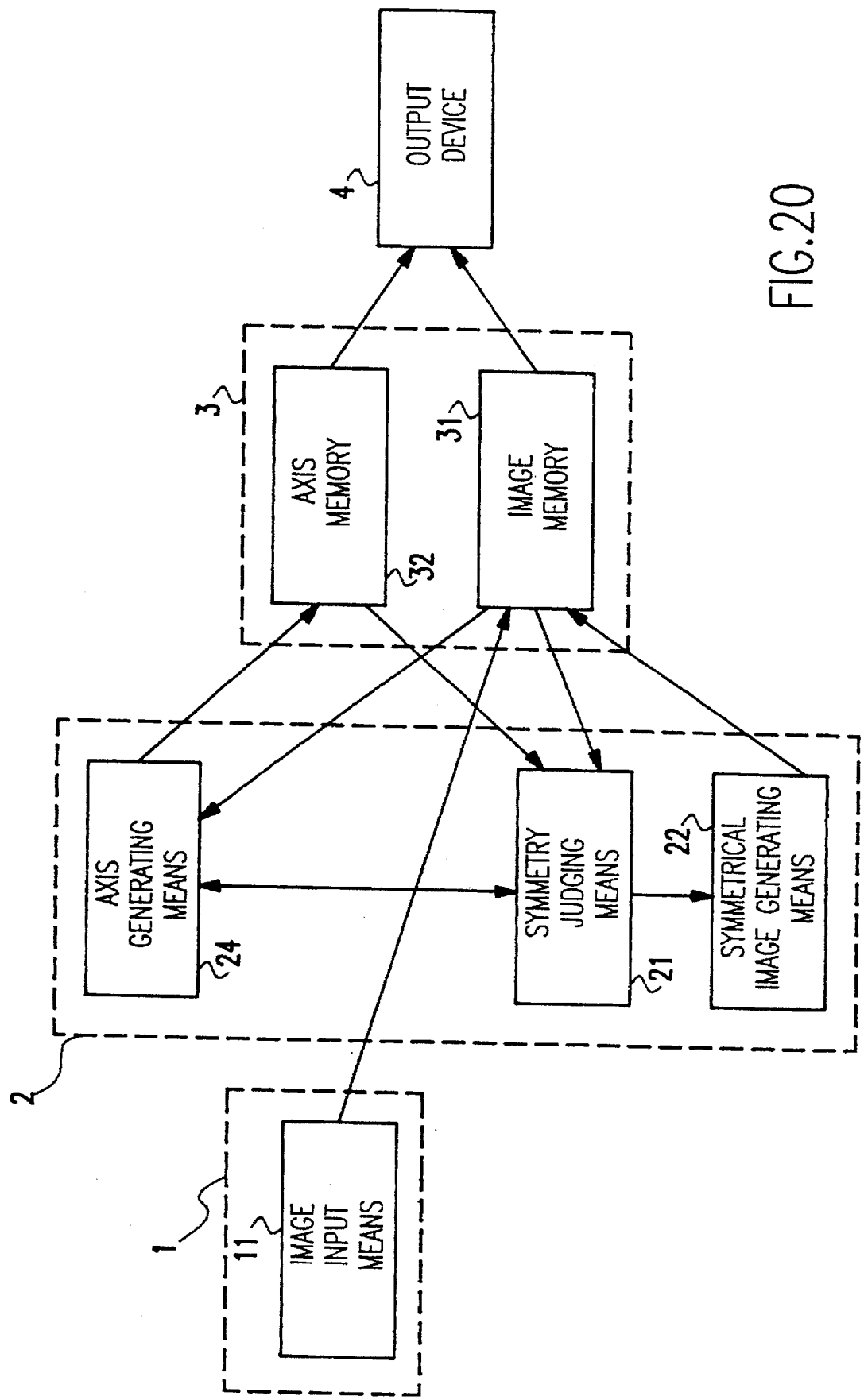
FIG. 20 is a block diagram of a sixth embodiment of the present invention.

Referring to FIG. 20, the sixth embodiment includes the same elements of the first embodiment except for the axis input means 12. Instead of the axis input means 12, the sixth embodiment includes axis generating means 24. The axis generating means 24 automatically generates or identifies the axis of symmetry of an input image. The operation of the axis generating means is detailed below.

Next is described the operation of the sixth embodiment.

Figure 21:
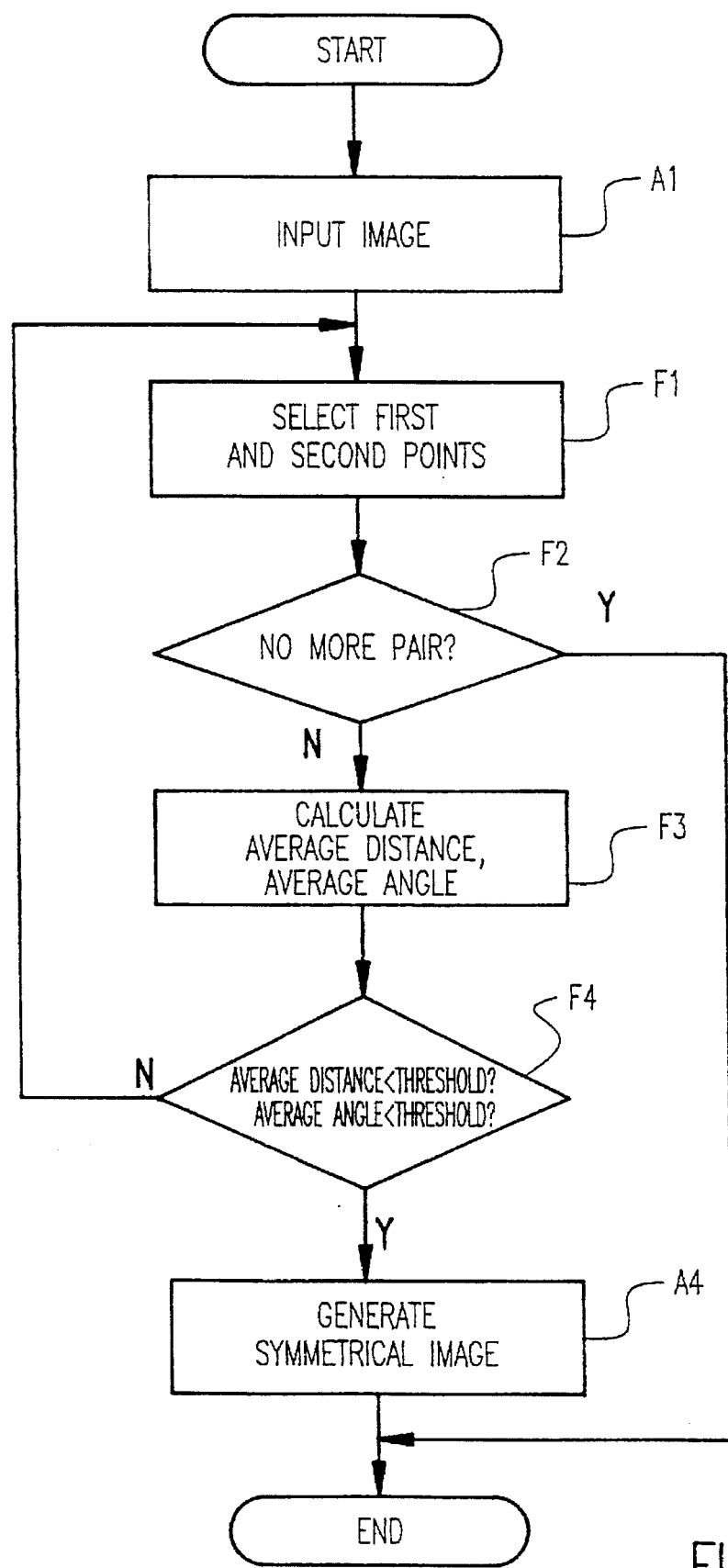
FIG. 21 is a flowchart showing the operation of the sixth embodiment.

Referring to FIGS. 21 and 23(a), in step A1, the image is input as in step A1 of the first embodiment.

Figure 22:
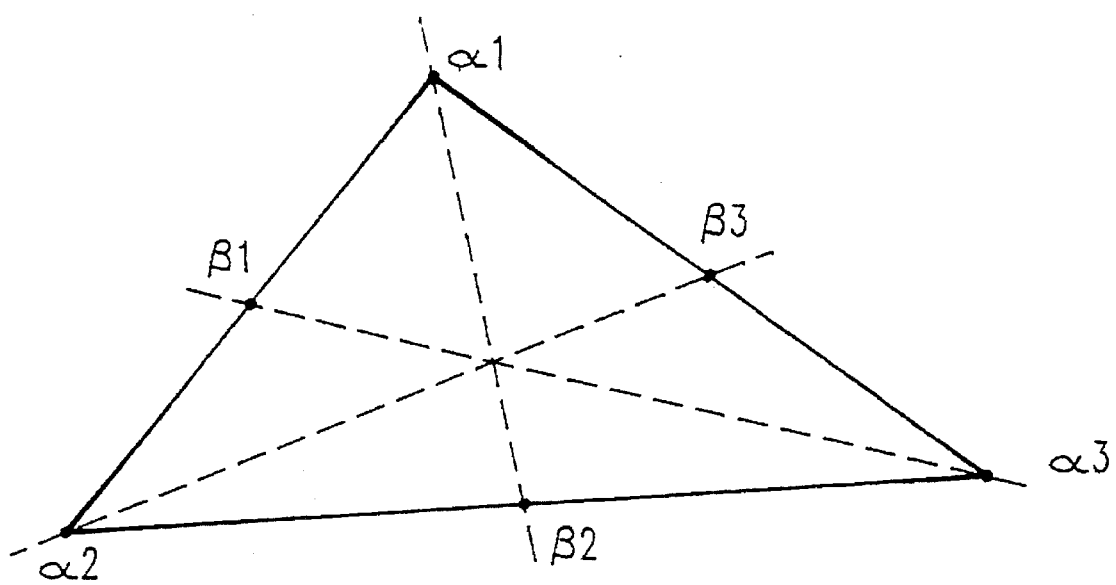
FIG. 22 illustrates a process of generating an axis of symmetry performed by axis generating means 24.

Referring to FIGS. 21 and 22, in step F1, the axis generating means 24 selects first and second points among the control points $\alpha i$ and the middle points $\beta i$ of line segments of the input image.

In step F3, the axis generating means 24 calculates the average distance and the average angle assuming the line segment between the first and second points to be the axis of symmetry.

In step F4, the axis generating means 24 determines whether the average distance and the average angle are less than a predetermined level (e.g., a threshold).

If the average distance and the average angles are less than the predetermined values, the axis generates means 24 identifies the line segment between the first and second points as the axis of symmetry, and step A4 is executed. Otherwise, steps F1 to F4 are performed for another combination of first and second points.

When steps F1 to F4 are performed for all the combination of first and second points, the operation is terminated (step F2.)

Referring to FIGS. 21 and 23(b), in step A4, a symmetrical image is generated as in step A4 of the first embodiment.

Next is described a modification of the sixth embodiment.

Instead of steps F3 and F4, the average distance and the average angles may be calculated for all the combinations of first and second points. Thereafter, the axis identifying means 24 identifies first and second points minimizing the average distance and the average angle. The axis identifying means 24 identifies the line segment between these points as the axis of symmetry.

Next is described a seventh embodiment of the present invention. In the seventh embodiment, axes of symmetry of a plurality of input images are automatically produced.

Figure 24:
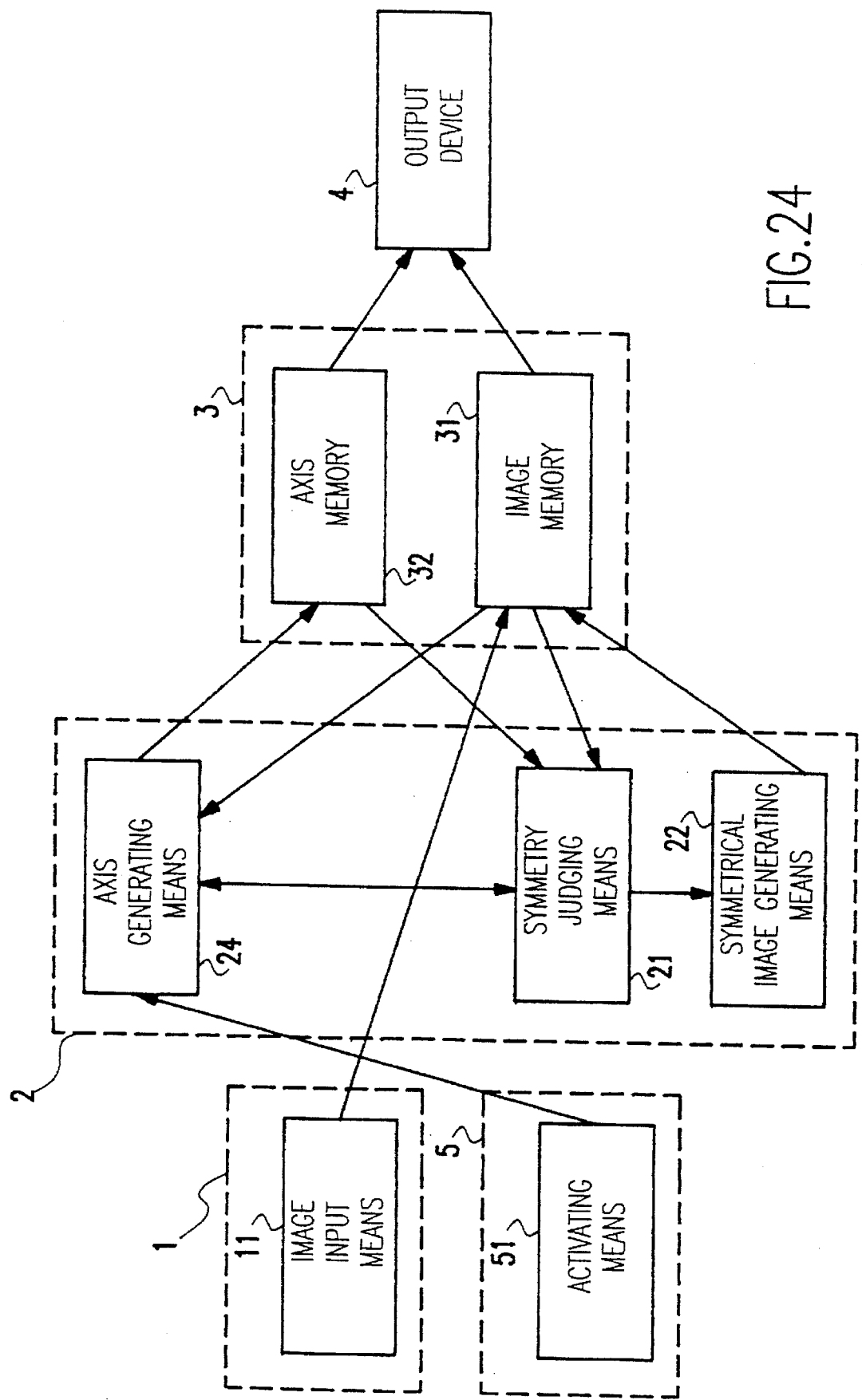
FIG. 24 is a block diagram of a seventh embodiment of the present invention.

Referring to FIG. 24, the seventh embodiment includes the activating means 51 in addition to the elements of the sixth embodiment.

Next is described the operation of the seventh embodiment.

Figure 25:
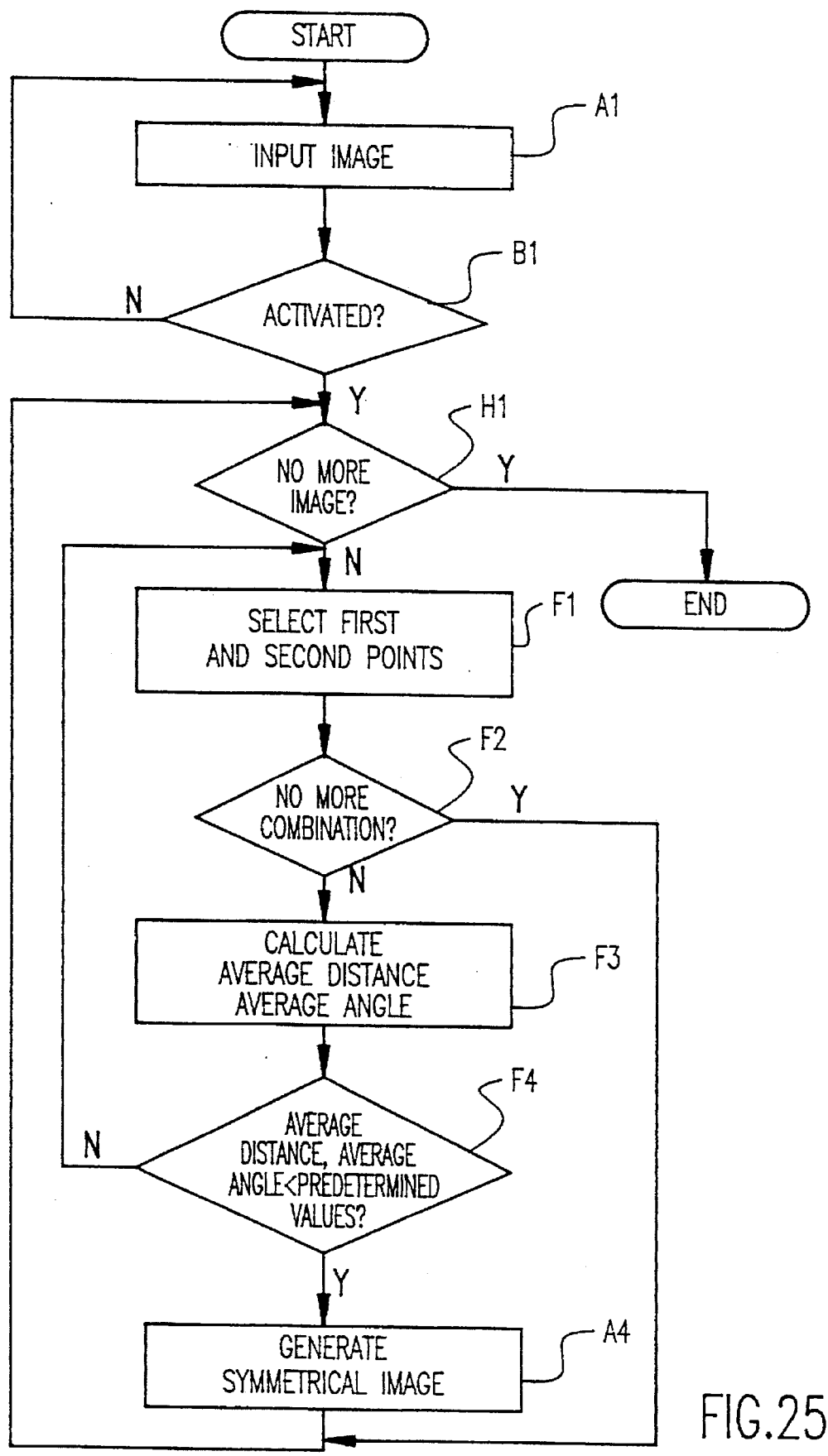
FIG. 25 is a flowchart showing the operation of the seventh embodiment.
Figure 26A:
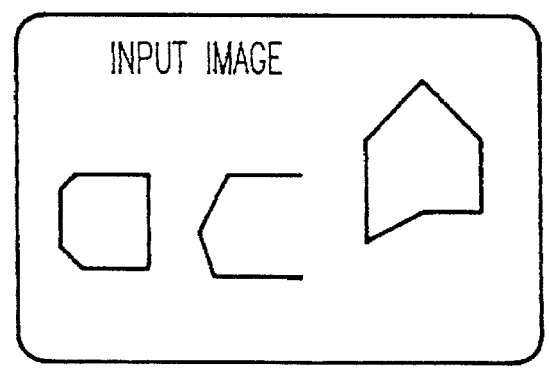
FIGS. 26(a) to 26(c) illustrate screen images displayed in steps A1, B1, and A4 in FIG. 25, respectively.

Referring to FIGS. 25 and 26(a), in step A1, a plurality of images are input by the operator as in step A1 of the second embodiment.

Figure 26B:
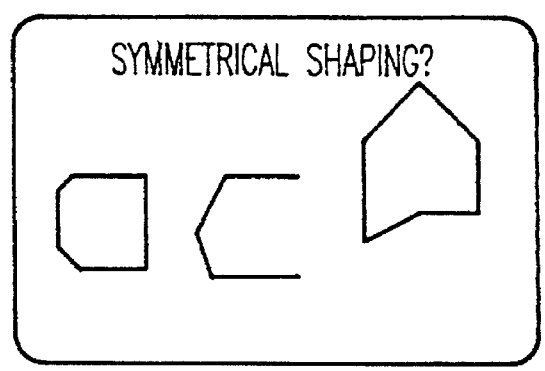

Referring to FIGS. 25 and 26(b), the activating means 51 waits for an instruction from the operator as in step B1 of the second embodiment.

Figure 26C:
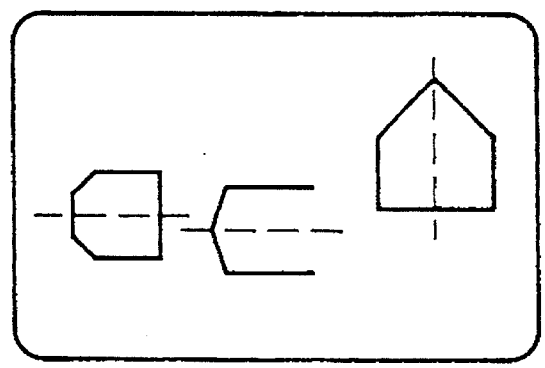

Referring to FIGS. 25 and 26(c), in steps F1 to F4, an axis of symmetry is automatically generated or identified for each of the image data as in steps F1 to F4 of the sixth embodiment.

Thereafter, in step A4, a symmetrical images is generated as in step A4 of the first embodiment.

In step H1, steps F1 to F4 and A4 are repeated until these steps are performed for all the input images.

Next is described an eighth embodiment of the present invention. In the eighth embodiment, one object image is selected among a plurality of input images. Thereafter, an axis of symmetry is automatically generated or identified for this object image.

Figure 27:
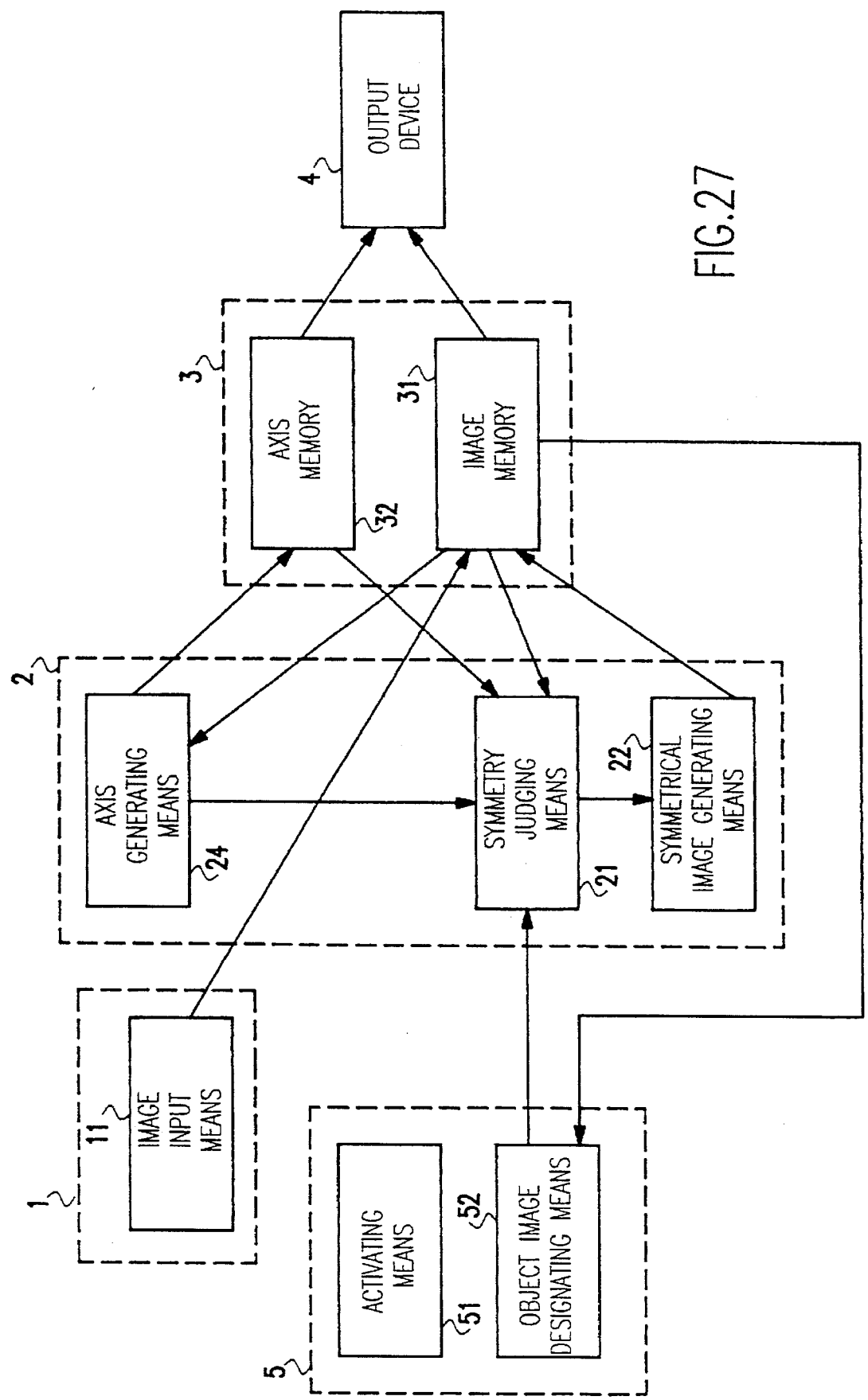
FIG. 27 is a block diagram of an eighth embodiment of the present invention.

Referring to FIG. 27, the eighth embodiment includes the object image designating means 52 in addition to the elements of the seventh embodiment.

Next is described the operation of the eighth embodiment.

Figure 28:
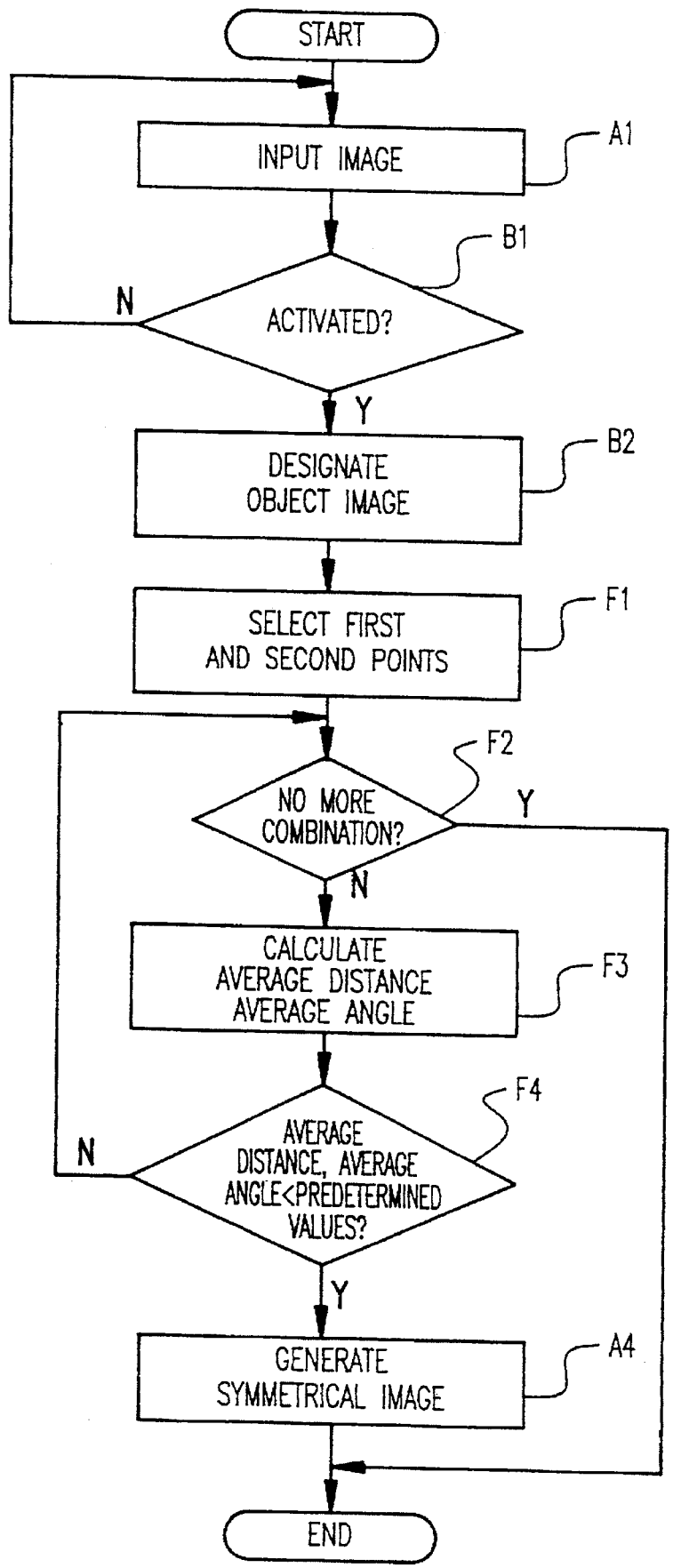
FIG. 28 is a flowchart showing the operation of the eighth embodiment.

Referring to FIG. 28, in steps A1, B1, and B2, a plurality of images are input. Thereafter, one of the input images is selected as an object image as in steps A1, B1, and B2 of the second embodiment.

In steps F1 to F4, an axis of symmetry is automatically generated or identified for the object image as in steps F1 to F4 of the sixth embodiment.

In step A4, a symmetrical image is generated from the object image as in step A4 of the first embodiment.

Next is described a ninth embodiment of the present invention. In the ninth embodiment, a group of object images are selected, and axes of symmetry are automatically generated for the object images.

Figure 29:
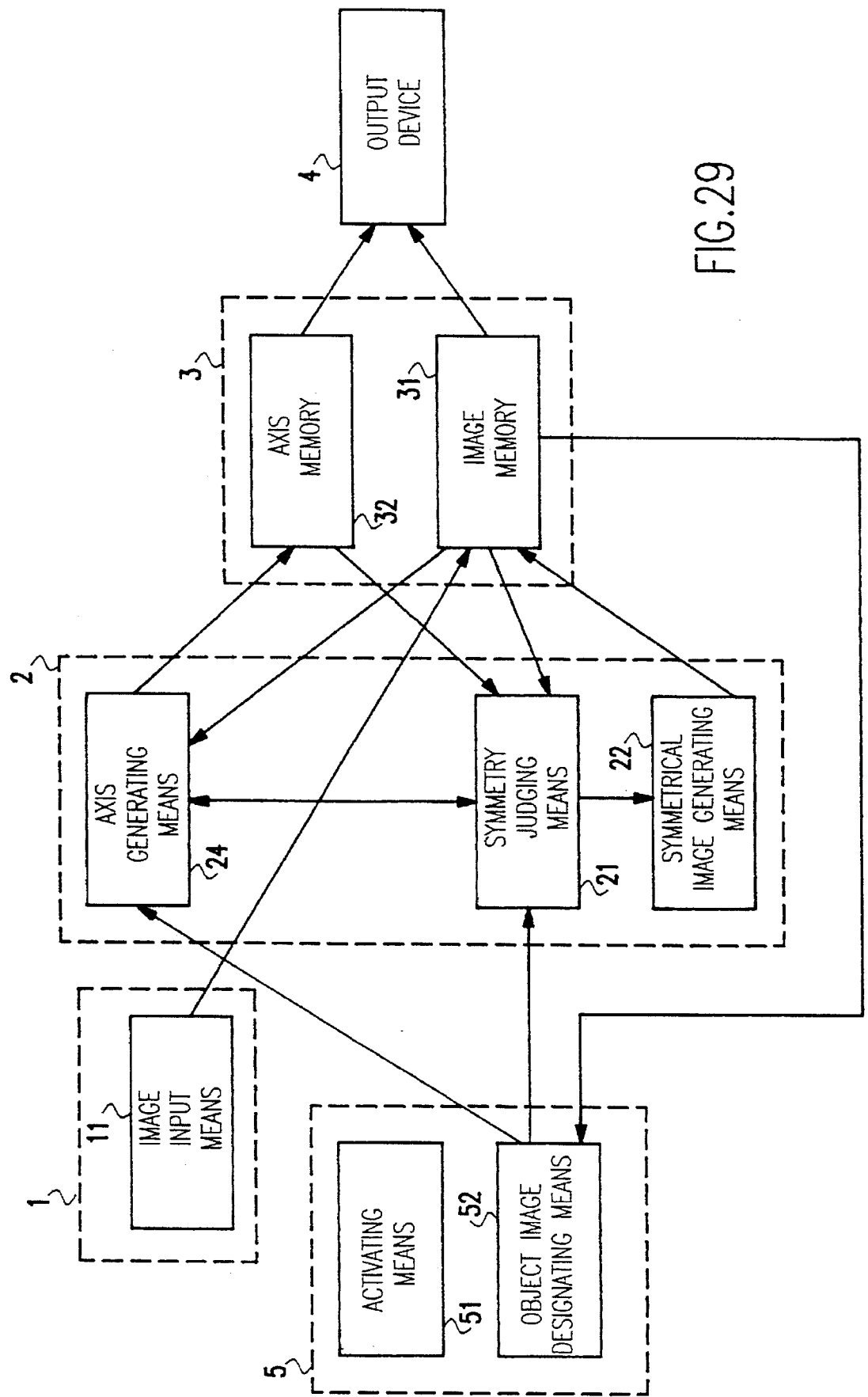
FIG. 29 is a block diagram of a ninth embodiment of the present invention.

Referring to FIG. 29, the ninth embodiment includes the same elements as the eighth embodiment.

Next is described the operation of the ninth embodiment.

Figure 30:
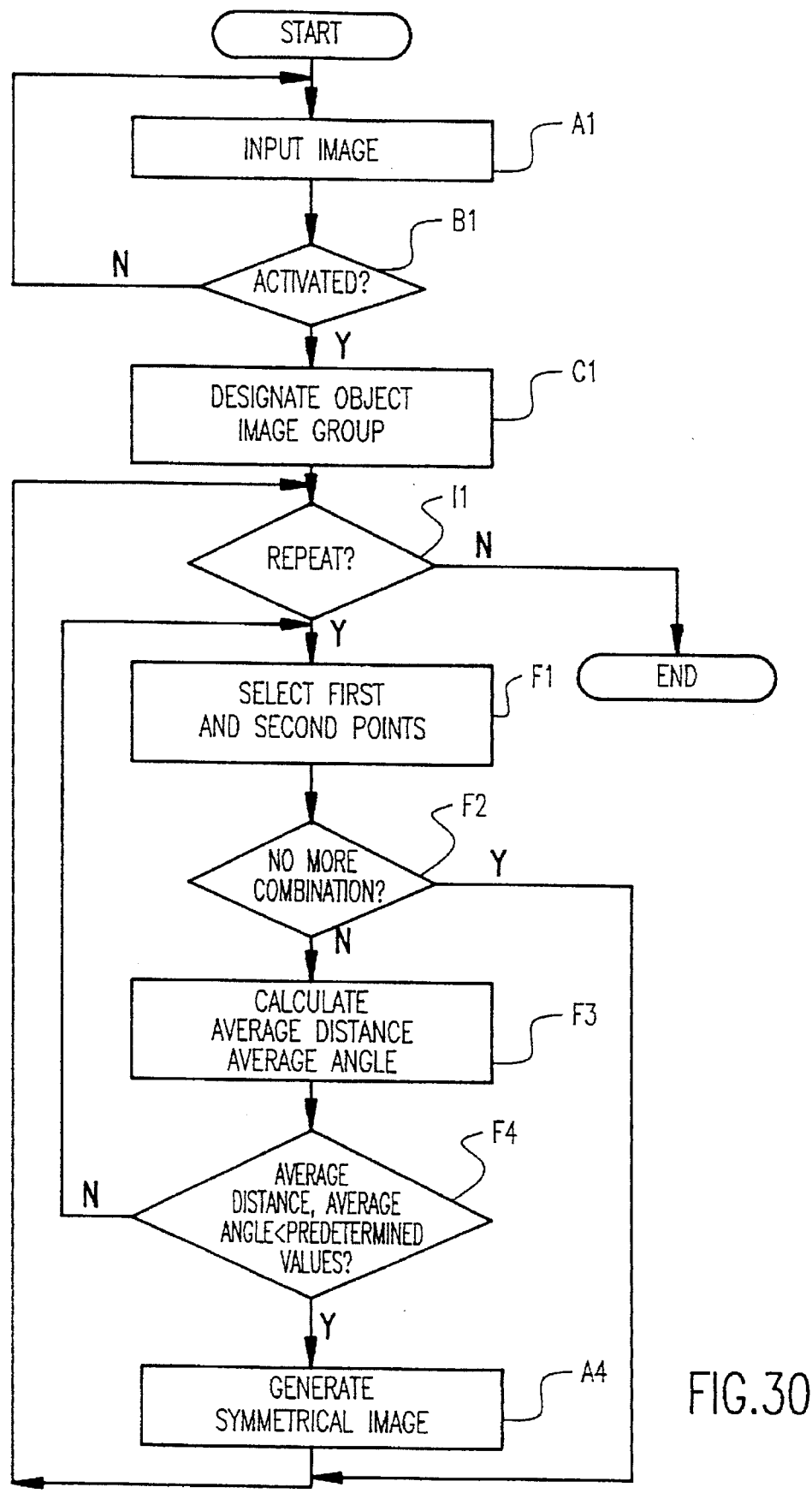
FIG. 30 is a flowchart showing the operation of the ninth embodiment.
Figure 31A:
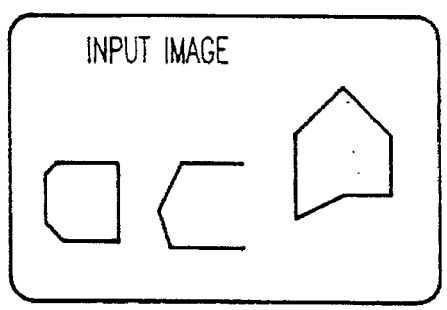
FIGS. 31(a) to 31(d) illustrate screen images displayed in steps A1, B1, C1, and A4 in FIG. 30, respectively.

Referring to FIGS. 30 and 31(a), in step A1, a plurality of images are input as in step A1 of the first embodiment.

Figure 31B:
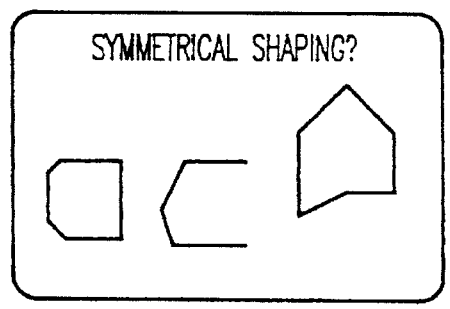

Referring to FIGS. 30 and 31(b), in step B1, the activating means 51 waits for an instruction from the operator as in step B1 of the second embodiment.

Figure 31C:
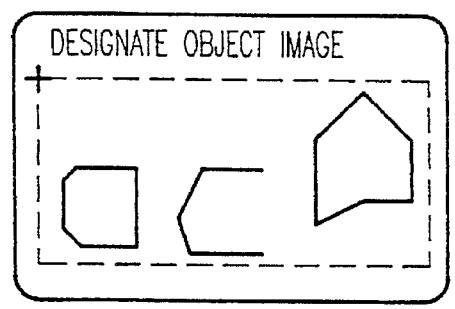

Referring to FIGS. 30 and 31(c), in step C1, a group of input images are designated as object images as in step C1 of the third embodiment.

Figure 31D:
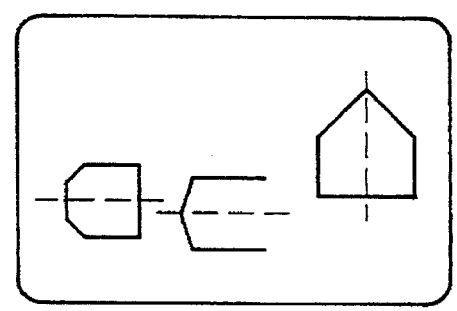

Referring to FIG. 30 and 31(d), in steps F1 to F4 and A4, one of the object images is selected. An axis of symmetry is generated or identified for the selected object image. Thereafter, a symmetrical image is generated from the selected object image.

Referring to FIG. 30, in step I1, steps F1 to F4 and A4 are repeated until these steps are performed for all the object images.

Next is described a tenth embodiment of the present invention. In the tenth embodiment, a specific method is designated as the method for generating a symmetrical image. In this exemplary embodiment, the symmetrical image is generated by a method depicted in FIG. 8(a). The operator designates one of the right and left sides as a fixed side.

Figure 32:
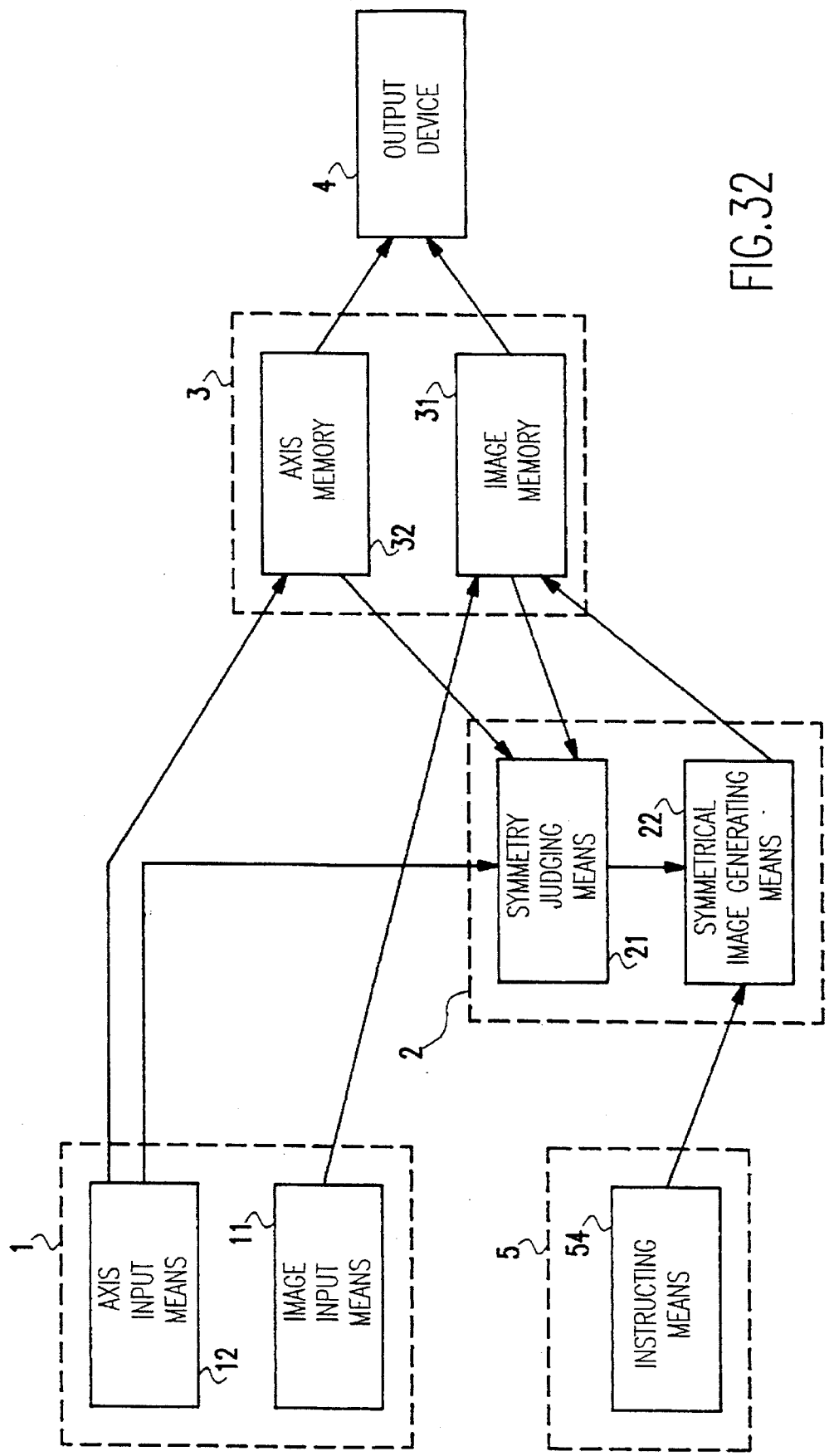
FIG. 32 is a block diagram of a tenth embodiment of the present invention.

Referring to FIG. 32, the tenth embodiment includes instructing means 54 in addition to the elements of the first embodiment. The instructing means 54 designates one of the right and left sides as a fixed side according to the instruction from the operator.

Next is described the operation of the tenth embodiment.

Figure 33:
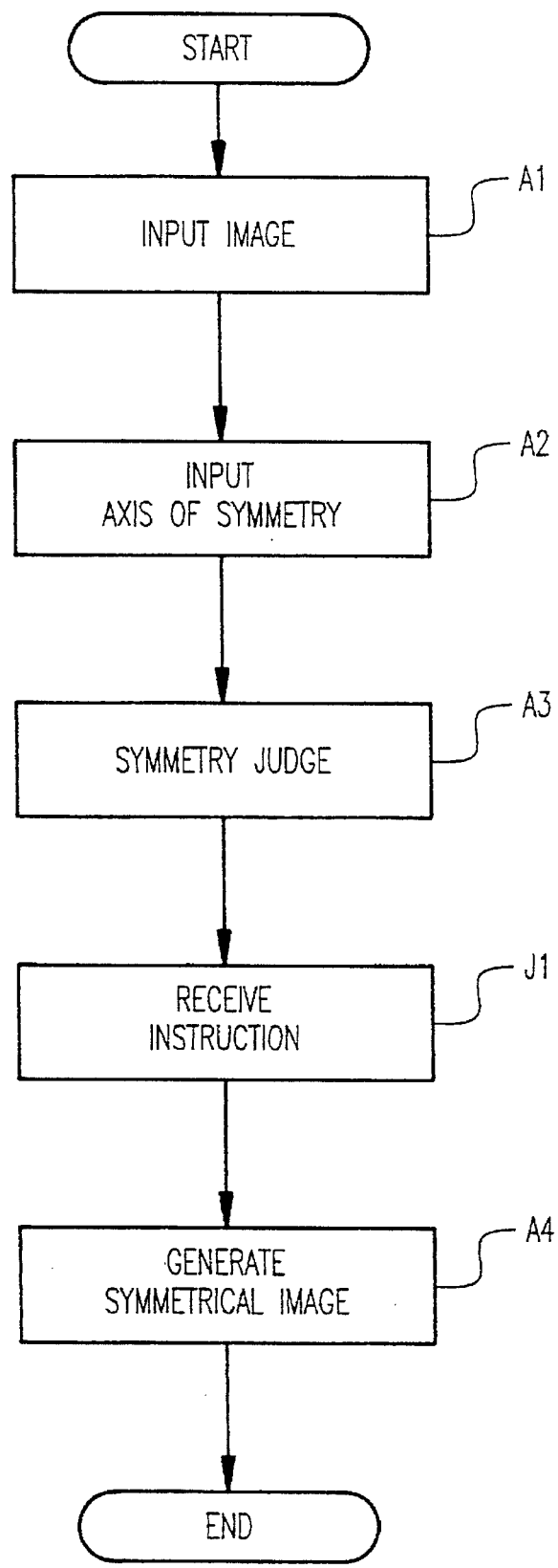
FIG. 33 is a flowchart showing the operation of the tenth embodiment.
Figure 34A:
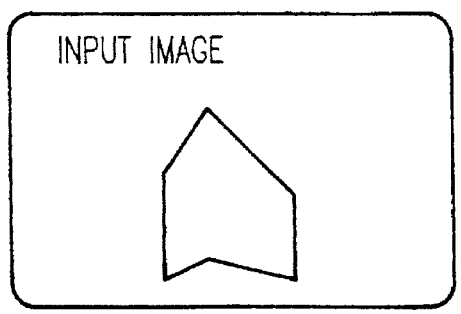
FIGS. 34(a) to 34(d) illustrate screen images displayed in steps A1, A2, J1, and A4 in FIG. 33, respectively.

Referring to FIGS. 33 and 34(a), in step A1, an image is input as in step A1 of the first embodiment.

Figure 34B:
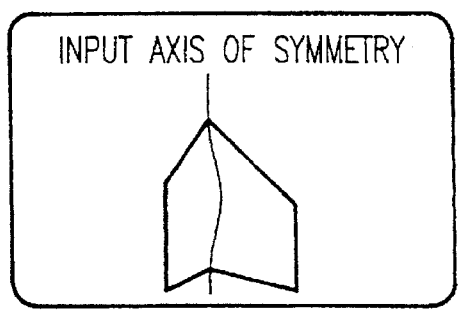

Referring to FIGS. 33 and 34(b), in step A2, an axis of symmetry is input as in step A2 of the first embodiment.

Referring to FIG. 33, in step A3, the symmetry judging means 21 determines whether the input image is approximately symmetrical as in step A3 of the first embodiment.

Figure 34C:
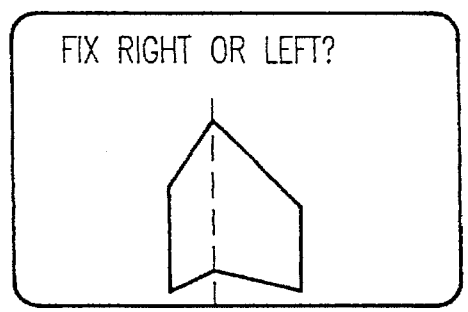

Referring to FIGS. 33 and 34(c), in step J1, the operator designates one of the right and left sides as a fixed side. This instruction is sent to the symmetrical image generating means 22 via the instructing means 54.

Figure 34D:
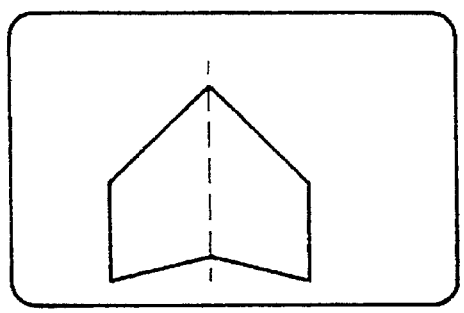

Referring to FIGS. 33 and 34(d), in step A4, the symmetrical image generating means 22 generates a symmetrical image from the input image according to the method depicted in FIG. 8(a). If the right side is designated as the fixed side, the generating means 22 adjusts the position of the left point so that the right and left points have symmetrical positions. If the left side is designated as the fixed side, the position of the right point is adjusted so that the right and left points have symmetrical positions.

Next is described an eleventh embodiment of the present invention. In the eleventh embodiment, a plurality of input images are designated as object images. A specific method of symmetrical image generation is designated and performed for the object images.

Referring to FIG. 35, the eleventh embodiment includes the instructing means 54 in addition to the elements of the second embodiment.

Next is described the operation of the eleventh embodiment.

Figure 36:
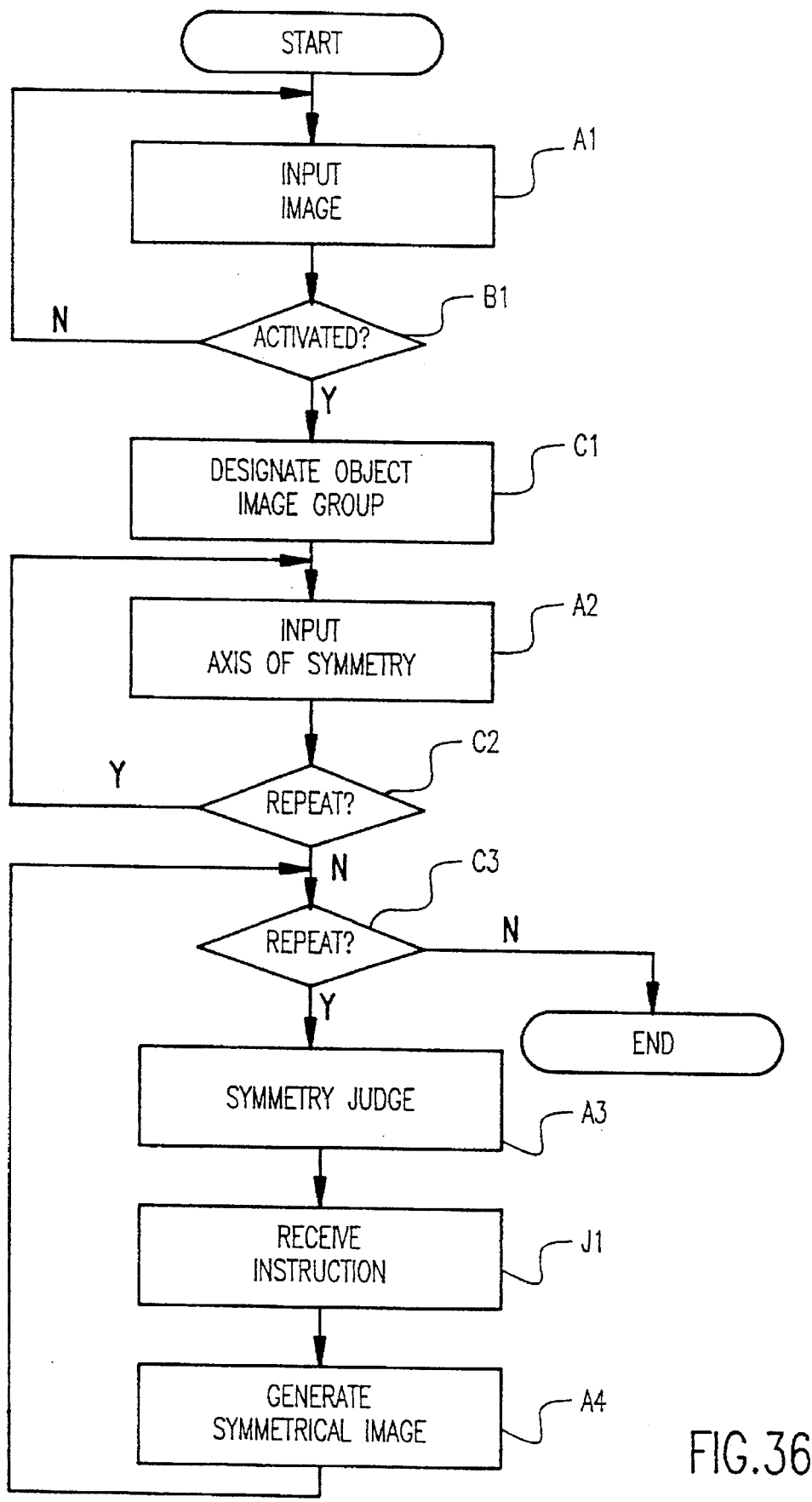
FIG. 36 is a flowchart showing the operation of the eleventh embodiment.
Figure 37A:
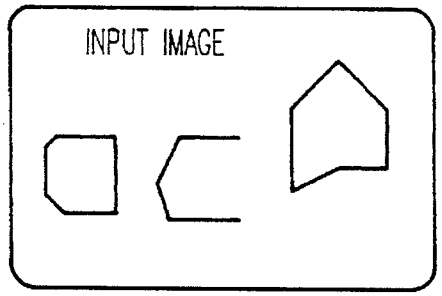
FIGS. 37(a) to 37(f) illustrate screen images displayed in steps A1, B1, C1, A2, J1, and A4 in FIG. 36, respectively.

Referring to FIGS. 36 and 37(a), in step A1, a plurality of images are input as in step A1 of the first embodiment.

Figure 37B:
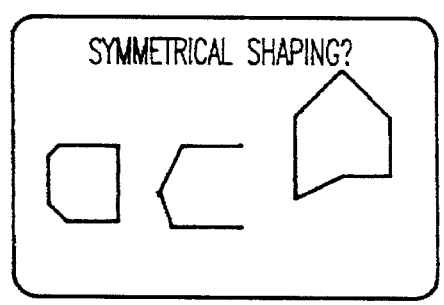

Referring to FIGS. 36 and 37(b), in step B1, the activating means 51 waits for an instruction from the operator as in step B1 of the second embodiment.

Figure 37C:
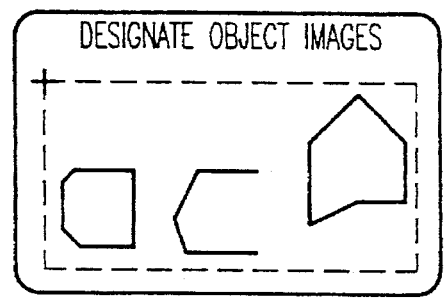

Referring to FIGS. 36 and 37(c), in step C1, a group of input images are designated as object images as in step C1 of the third embodiment.

Figure 37D:
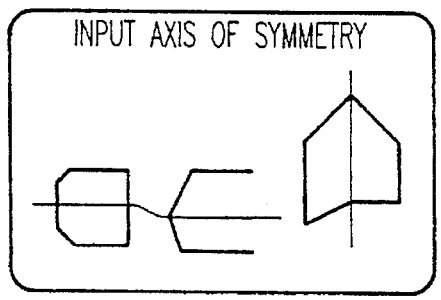

Referring to FIGS. 36 and 37(d), in step A2 and C2, an axis of symmetry is input for each of the object images as in steps A2 and C2 of the third embodiment.

Referring to FIGS. 36, in step A3, the symmetry judging means 21 selects one of the object images and determines whether the selected object image is approximately symmetrical as in step A3 of the first embodiment.

Figure 37E:
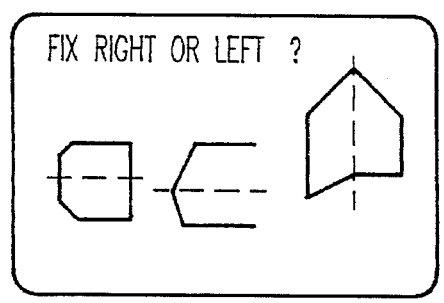

Referring to FIGS. 36 and 37(e), in step J1, a specific method of symmetrical image generation is designated as in step J1 of the tenth embodiment.

Figure 37F:
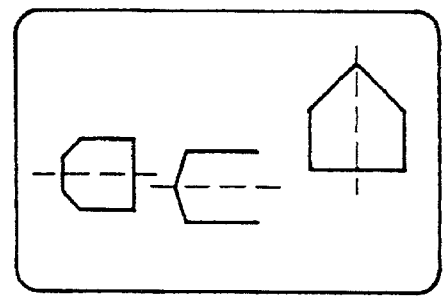

Referring to FIGS. 36 and 37(f), in step A4, a symmetrical image is generated from the selected object image according to the method specified in step J1 as in step A4 of the tenth embodiment.

Referring to FIG. 36, steps A3, J1, and A4 are repeated until these steps are performed for all the object images.

Next is described a modification of the tenth and eleventh embodiments.

The instructing means 54 may send other types of instructions to the symmetrical image generating means 22. The instructing means 54 may instruct that the position of the input image is adjusted, whereas the position and direction of the axis of symmetry are fixed. The instructing means 54 also may instruct that the position and the direction of the axis of symmetry are to be adjusted, whereas the position of the input image is to be fixed. When the axis of symmetry is approximately horizontal, the instructing means 54 may designate one of the upper and lower sides as the fixed side.

Next is described a modification of the method for identifying the axis of symmetry of an image having first and second end points.

Figure 38:
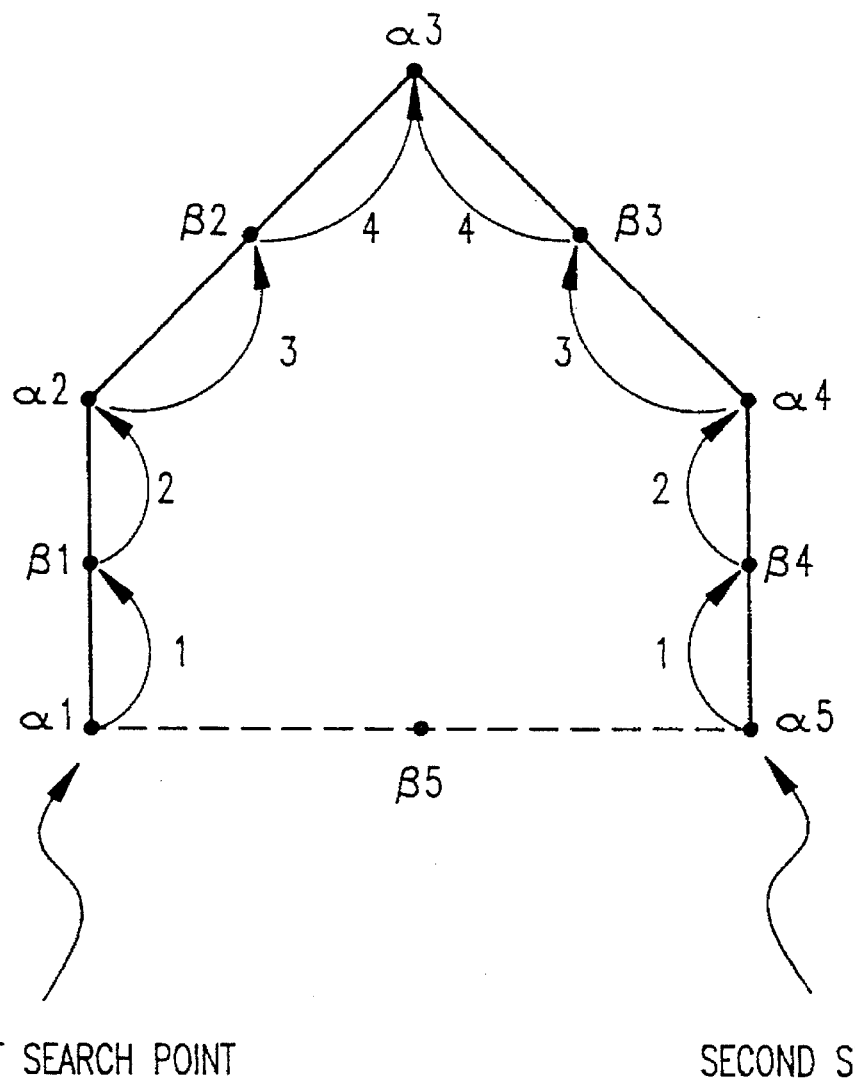
FIG. 38 illustrates a modified process for identifying an axis of symmetry.

Referring to FIG. 38, in a first step of this modification, the positions of the control points $\alpha i$ and the middle points $\beta i$ are calculated.

In a second step, first and second search points start traveling among the points $\alpha i$ and $\beta i$ from first and second end points. The first and second search points repeat movements from one point to another until the first and second search points meet. The first and second search points meet at a center point of a point set including the points $\alpha i$ and $\beta i$. The center point is determined as an end point of the axis of the symmetry.

In the exemplary case depicted in FIG. 38, the first and second search points meet in the fourth movement at center point $\alpha 3$. Therefore, point $\alpha 3$ is determined as a first end point of the axis of the symmetry. The second end point of the axis of symmetry is the middle point $\beta 5$ between the end points $\alpha 1$ and $\alpha 5$ as in the first embodiment.

The present embodiments are therefore, to be considered in all respects as illustrative and not restrictive, the scope of the invention being indicated by the appended claims rather than by the foregoing description and all changes which come within the meanings and range of equivalency of the claims are therefore intended to the embraced therein.

What is claimed is:

1. A computer-implemented method of generating a symmetrical image from an object image having a plurality of control points, said method for use with a computer system including input and output devices, said method comprising steps of:

(a) receiving from said input device image data representing an entire object image including information indicative of positions of said control points;

(b) determining an axis of symmetry of said object image;

(c) pairing a first control point with a second control point having a symmetrical relationship with said first control point; and (d) modifying said image data so that said first and second control points have symmetrical positions about said axis of symmetry.

2. A method according to claim 1, wherein step (c) comprises a step of:

(c1) judging whether said object image has an approximately symmetrical configuration.

3. A method according to claim 2, wherein said step (c1) comprises steps of:

(c11) calculating a distance between said axis of symmetry and a middle point of a line segment between said first and second control points;

(c12) calculating an average distance by performing steps (c) and (c11) for different pairs of control points of said plurality of control points; and (c13) determining whether said average distance is less than a predetermined value.

4. A method according to claim 2, wherein said step (c) comprises steps of:

(c14) calculating an angle between a line perpendicular to said axis of symmetry and a line segment between said first and second control points;

(c15) calculating an average angle by performing steps (c) and (c14) for different pairs of control points of said plurality of control points; and (c16) determining whether said average angle is less than a predetermined value.

5. A method according to claim 1, wherein said step (d) comprises a step of:

(d1) adjusting a position of one of said first and second control points and fixing a position of the other of said first and second control points.

6. A method according to claim 1, wherein said step (d) comprises a step of:

(d2) positioning said first control point from (−x1, y1) to (−x1',y1'), and positioning said second control point from (x2, y2) to (x2', y2'), wherein x1'=x2'=(x1+x2)/2, and said axis of symmetry coincides with the y-axis.

7. A method according to claim 1, wherein said step (d) comprises a step of:

(d2) positioning said first control point from (−x1, y1) to (−x1',y1'), and positioning said second control point from (x2, y2) to (x2', y2'), wherein y1'=y2'=(y1+y2)/2, and said axis of symmetry coincides with the y-axis.

8. A method according to claim 1, wherein said step (d) comprises a step of:

(d4) rotating said first and second points about a point γ so that said axis of symmetry is perpendicular to a line segment between said first and second control points, wherein said point γ is a point of intersection of said axis of symmetry and said line segment.

9. A method according to claim 1, wherein said step (b) comprises steps of:

(b1) receiving axis of symmetry data representing an input line from said input device; and (b2) determining said axis of symmetry based on said axis data.

10. A method according to claim 9, wherein step (b2) comprises steps of:

(b21) determining first and second points of intersection of said input line and said object image;

(b22) selecting first and second intersecting points nearest said first and second points, respectively, from said control points and middle points between said control points; and (b23) identifying a line between said first and second points as said axis of symmetry.

11. A method according to claim 9, wherein step (b2) comprises steps of:

(b24) determining whether said object image has first and second end points;

(b25) determining a point of intersection of said input line and said object image;

(b26) selecting a first intersecting point nearest said point from said control points and middle points between said control points;

(b27) calculating a position of a middle point between said first and second end points; and (b28) identifying a line between said first and second points as said axis of symmetry.

12. A method according to claim 1, wherein step (a) comprises a step of:

(a1) selecting said object image from a plurality of images represented by said image data.

13. A method according to claim 1, wherein step (a) comprises a step of:

(a2) selecting a group of object images from a plurality of images represented by said image data, and said method further comprises a step of:

(e) performing steps (b) through (d) for each object image of said group of object images.

14. A method according to claim 9, wherein step (b) comprises a step of:

(b3) selecting an image intersecting said input line as said object image from a plurality of images represented by said image data.

15. A method according to claim 14, wherein step (b) comprises a step of:

(b4) repeating steps (b1) through (b3) to select a group of object images.

16. A method according to claim 1, wherein step (b) comprises a step of:

(b5) generating said axis of symmetry by referring to said image data.

17. A method according to claim 16, wherein said step (b5) comprises steps of:

(b51) selecting first and second points from said control points and middle points of segment lines comprising said object image;

(b52) judging whether said object image has a substantially symmetrical shape about a line segment between said first and second points; and (b53) identifying said line segment as said axis of symmetry when said object image is symmetrical about said line segment.

18. A method according to claim 16, wherein step (b5) comprises a step of:

(b54) performing steps (b5) through (b7) for each of a plurality of object images.

19. A method according to claim 12, wherein step (b) comprises a step of:

(b6) generating said axis of symmetry for said object image.

20. A method according to claim 13, wherein step (b) comprises a step of:

(b7) generating said axis of symmetry for each object image of said group of object images.

21. A method according to claim 1, wherein step (d) comprises steps of:

(d31) receiving from said input device information indicative of a specific method for generating said symmetrical image; and (d32) modifying said image data according to said specific method.

22. A method according to claim 13, wherein step (d) comprises steps of:

(d31) receiving from said input device information indicative of a specific method for generating said symmetrical image; and (d32) modifying said image data according to said specific method.

23. A method according to claim 1, wherein said object data includes a polygon, said control points include vertices of said polygon, and said image data includes information indicative of pairs of said control points to be connected by a line segment.

24. A method according to claim 1, wherein step (b2) comprises steps of:

(b241) determining whether said object image has first and second end points;

(b242) identifying a center point of a point set including said control points and middle points of sides of said object image;

(b243) calculating a position of a middle point between said first and second end points; and (b244) identifying a line between said center point and said middle point as said axis of symmetry.

* * * * *